US012552874B2

(12) United States Patent
Padler-Karavani et al.

(10) Patent No.: US 12,552,874 B2
(45) Date of Patent: Feb. 17, 2026

(54) ANTIBODIES TO CARBOHYDRATE ANTIGENS

(71) Applicant: RAMOT AT TEL-AVIV UNIVERSITY LTD., Tel Aviv (IL)

(72) Inventors: Vered Padler-Karavani, Tel Aviv (IL); Ron Amon, Tel Aviv (IL); Ronit Rosenfeld, Tel Aviv (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 939 days.

(21) Appl. No.: 17/779,720

(22) PCT Filed: Nov. 25, 2020

(86) PCT No.: PCT/IL2020/051214
§ 371 (c)(1),
(2) Date: May 25, 2022

(87) PCT Pub. No.: WO2021/105988
PCT Pub. Date: Jun. 3, 2021

(65) Prior Publication Data
US 2023/0174664 A1  Jun. 8, 2023

Related U.S. Application Data

(60) Provisional application No. 63/060,675, filed on Aug. 4, 2020, provisional application No. 62/940,273, filed on Nov. 26, 2019.

(51) Int. Cl.
| | |
|---|---|
| C07K 16/28 | (2006.01) |
| A61K 47/68 | (2017.01) |
| A61P 35/00 | (2006.01) |
| C07K 16/00 | (2006.01) |
| C07K 16/46 | (2006.01) |
| G01N 33/574 | (2006.01) |

(52) U.S. Cl.
CPC ...... *C07K 16/2896* (2013.01); *A61K 47/6849* (2017.08); *A61P 35/00* (2018.01); *G01N 33/57492* (2013.01); *C07K 16/00* (2013.01); *C07K 16/46* (2013.01); *C07K 2317/565* (2013.01); *C07K 2317/567* (2013.01); *C07K 2317/622* (2013.01); *C07K 2317/734* (2013.01); *C07K 2317/92* (2013.01); *G01N 2400/02* (2013.01)

(58) Field of Classification Search
CPC .......... C07K 16/2896; C07K 2317/565; C07K 2317/567; C07K 2317/622; C07K 2317/734; C07K 2317/92; C07K 2317/35; C07K 2317/52; C07K 16/3076; C07K 2317/73; A61K 47/6849; A61P 35/00; G01N 33/57492; G01N 2400/02
See application file for complete search history.

(56) References Cited

U.S. PATENT DOCUMENTS

| 4,471,057 | A | 9/1984 | Koprowski |
| 7,465,787 | B2 | 12/2008 | Wittrup |
| 10,036,747 | B2 | 7/2018 | Pancer |
| 2020/0308223 | A1 | 10/2020 | Chang |

FOREIGN PATENT DOCUMENTS

| EP | 0404097 A2 | 12/1990 |
| EP | 3328894 B1 | 11/2018 |
| EP | 3265490 B1 | 5/2019 |
| EP | 3423496 B1 | 7/2019 |
| KR | 20190092285 A | 8/2019 |
| WO | 9311161 A1 | 6/1993 |
| WO | 0127159 A2 | 4/2001 |
| WO | 2012079000 A1 | 6/2012 |
| WO | 2013040557 A2 | 3/2013 |
| WO | 2013074916 A1 | 5/2013 |
| WO | 2015053871 A2 | 4/2015 |
| WO | 2016057890 A1 | 4/2016 |
| WO | 2016077526 A1 | 5/2016 |
| WO | 2017025038 A1 | 2/2017 |
| WO | 2018160909 A1 | 9/2018 |
| WO | 2020081988 A1 | 4/2020 |
| WO | 2021105989 A1 | 6/2021 |
| WO | 2022113066 A1 | 6/2022 |
| WO | 2022153298 A1 | 7/2022 |

OTHER PUBLICATIONS

Partyka et al., (2012) Diverse monoclonal antibodies against the CA 19-9 antigen show variation in binding specificity with consequences for clinical interpretation. Author Manuscript. Proteomics 12(13): 2212-2220.
Sawada et al., (2011) Human monoclonal antibodies to sialyl-Lewis (CA19.9) with potent CDC, ADCC, and antitumor activity. Clin Cancer Res 17(5): 1024-1032.
Amon et al., (2020) Directed Evolution of Therapeutic Antibodies Targeting Glycosylation in Cancer. Cancers (Basel) 12(10): 2824. With Supplementary Materials.
Ashkani and Naidoo (2016) Glycosyltransferase Gene Expression Profiles Classify Cancer Types and Propose Prognostic Subtypes. Sci Rep 6: 26451.
Benatuil et al., (2010) An improved yeast transformation method for the generation of very large human antibody libraries. Protein Eng Des Sel 23(4): 155-159.
Bird et al., (1988) Single-chain antigen-binding proteins. Science 242(4877): 423-426.
Boligan et al., (2015) Cancer intelligence acquired (CIA): tumor glycosylation and sialylation codes dismantling antitumor defense. Cell Mol Life Sci 72(7): 1231-1248.

(Continued)

*Primary Examiner* — Chun W Dahle
*Assistant Examiner* — Alec Jon Peters
(74) *Attorney, Agent, or Firm* — Ballard Spahr LLP

(57) ABSTRACT

The present invention discloses novel monoclonal antibodies and functional fragments thereof that specifically bind to SLeA carbohydrate antigen with high specificity and selectivity. The invention further provides compositions comprising the antibodies or fragments thereof as well as uses of the antibodies, fragments and compositions.

17 Claims, 8 Drawing Sheets
Specification includes a Sequence Listing.

(56) References Cited

OTHER PUBLICATIONS

Colby et al., (2004) Engineering antibody affinity by yeast surface display. Methods Enzymol 388: 348-358.
DeSelm et al., (2018) Low-Dose Radiation Conditioning Enables CAR T Cells to Mitigate Antigen Escape. Mol Ther 26(11): 2542-2552.
Dube and Bertozzi (2005) Glycans in cancer and inflammation—potential for therapeutics and diagnostics. Nat Rev Drug Discov 4(6): 477-488.
Elinav et al., (2009) Amelioration of colitis by genetically engineered murine regulatory T cells redirected by antigen-specific chimeric receptor. Gastroenterology 136(5): 1721-1731.
Eshhar et al., (1993) Specific activation and targeting of cytotoxic lymphocytes through chimeric single chains consisting of antibody-binding domains and the gamma or zeta subunits of the immunoglobulin and T-cell receptors. Proc Natl Acad Sci U S A 90(2): 720-724.
Fesnak et al., (2016) Engineered T cells: the promise and challenges of cancer immunotherapy. Nat Rev Cancer. Author manuscript; available in PMC Aug. 23, 2017. Published in final edited form as: Nat Rev Cancer. Aug. 23, 2016; 16(9): 566-581.
Friedmann-Morvinski et al., (2005) Redirected primary T cells harboring a chimeric receptor require costimulation for their antigen-specific activation. Blood 105(8): 3087-3093.
Gauthier and Yakoub-Agha (2017) Chimeric antigen-receptor T-cell therapy for hematological malignancies and solid tumors: Clinical data to date, current limitations and perspectives. Curr Res Transl Med 65(3): 93-102.
Gross et al., (1989) Expression of immunoglobulin-T-cell receptor chimeric molecules as functional receptors with antibody-type specificity. Proc Natl Acad Sci U S A 86(24): 10024-10028.
Holliger et al., (1993) "Diabodies": small bivalent and bispecific antibody fragments. Proc Natl Acad Sci U S A 90(14): 6444-6448.
Hong et al., (2013) Sugar-binding proteins from fish: selection of high affinity "lambodies" that recognize biomedically relevant glycans. ACS Chem Biol. Author manuscript; available in PMC Jan. 18, 2014. Published in final edited form as: ACS Chem Biol. Jan. 18, 2013; 8(1): 152-160.
Hughes et al., (2005) Transfer of a TCR gene derived from a patient with a marked antitumor response conveys highly active T-cell effector functions. Hum Gene Ther. Author manuscript; available in PMC Jun. 12, 2006. Published in final edited form as: Hum Gene Ther. Apr. 2005; 16(4): 457-472.
Huston et al., (1988) Protein engineering of antibody binding sites: recovery of specific activity in an anti-digoxin single-chain Fv analogue produced in *Escherichia coli*. Proc Natl Acad Sci U S A 85(16): 5879-5883.
Keyel and Reynolds (2018) Spotlight on dinutuximab in the treatment of high-risk neuroblastoma: development and place in therapy. Biologics 13: 1-12.
Kochenderfer and Rosenberg (2013) Treating B-cell cancer with T cells expressing anti-CD19 chimeric antigen receptors. Nat Rev Clin Oncol. Author manuscript; available in PMC Jan. 7, 2019. Published in final edited form as: Nat Rev Clin Oncol. May 2013; 10(5): 267-276.
Koprowski et al., (1979) Colorectal carcinoma antigens detected by hybridoma antibodies. Somatic Cell Genet 5(6): 957-971.
Lei et al., (2016) Immunocompromised and immunocompetent mouse models for head and neck squamous cell carcinoma. Onco Targets Ther 9: 545-555.
Leviatan Ben-Arye et al., (2017) Profiling Anti-Neu5Gc IgG in Human Sera with a Sialoglycan Microarray Assay. J Vis Exp (125): 56094.
Louis et al., (2011) Antitumor activity and long-term fate of chimeric antigen receptor-positive T cells in patients with neuroblastoma. Blood 118(23): 6050-6056.
Loureiro et al., (2018) Development of a novel target module redirecting UniCAR T cells to Sialyl Tn-expressing tumor cells. Blood Cancer J 8(9): 81.
Maliar et al., (2012) Redirected T cells that target pancreatic adenocarcinoma antigens eliminate tumors and metastases in mice. Gastroenterology 143(5): 1375-1384.e5.
Mare and Trinchera (2004) Suppression of beta 1,3galactosyltransferase beta 3Gal-T5 in cancer cells reduces sialyi-Lewis a and enhances poly N-acetyllactosamines and sialyl-Lewis x on O-glycans. Eur J Biochem 271(1): 186-194.
Padler-Karavani et al., (2012) Cross-comparison of protein recognition of sialic acid diversity on two novel sialoglycan microarrays. J Biol Chem 287(27): 22593-22608.
Pinthus et al., (2004) Adoptive immunotherapy of prostate cancer bone lesions using redirected effector lymphocytes. J Clin Invest 114(12): 1774-1781.
Posey et al., (2016) Engineered CAR T Cells Targeting the Cancer-Associated Tn-Glycoform of the Membrane Mucin MUC1 Control Adenocarcinoma. Immunity 44(6): 1444-1454.
Sadelain et al., (2009) The promise and potential pitfalls of chimeric antigen receptors. Curr Opin Immunol. Author manuscript; available in PMC Aug. 8, 2017. Published in final edited form as: Curr Opin Immunol. Apr. 2009; 21(2): 215-223.
Sadelain et al., (2013) The basic principles of chimeric antigen receptor design. Cancer Discov 3(4): 388-398.
Sadelain et al., (2017) Therapeutic T cell engineering. Nature 545(7655): 423-431.
Steentoft et al., (2018) Glycan-directed CAR-T cells. Glycobiology 28(9): 656-669.
Stowell et al., (2015) Protein glycosylation in cancer. Annu Rev Pathol. Author manuscript; available in PMC Jan. 1, 2016. Published in final edited form as: Annu Rev Pathol. 2015; 10: 473-510.
Takada et al., (1993) Contribution of carbohydrate antigens sialyl Lewis A and sialyl Lewis X to adhesion of human cancer cells to vascular endothelium. Cancer Res 53(2): 354-361.
Turtle (2014) Chimeric antigen receptor modified T cell therapy for B cell malignancies. Int J Hematol 99(2): 132-140.
Ugorski and Laskowska (2002) Sialyl Lewis(a): a tumor-associated carbohydrate antigen involved in adhesion and metastatic potential of cancer cells. Acta Biochim Pol 49(2): 303-311.
Ward et al., (1989) Binding activities of a repertoire of single immunoglobulin variable domains secreted from *Escherichia coli*. Nature 341(6242): 544-546.
Zhao et al., (2009) A herceptin-based chimeric antigen receptor with modified signaling domains leads to enhanced survival of transduced T lymphocytes and antitumor activity. J Immunol 183(9): 5563-5574.
Zhao et al., (2015) Alteration of Electrostatic Surface Potential Enhances Affinity and Tumor Killing Properties of Anti-ganglioside GD2 Monoclonal Antibody hu3F8. J Biol Chem 290(21): 13017-13027.
Zhou et al., (2011) Immunologic mapping of glycomes: implications for cancer diagnosis and therapy. Front Biosci (Schol Ed) 3(4): 1520-1532.
Ahmadzadeh et al., (2014) Antibody humanization methods for development of therapeutic applications. Monoclon Antib Immunodiagn Immunother 33(2): 67-73.
Boyiadzis et al., (2018) Chimeric antigen receptor (CAR) T therapies for the treatment of hematologic malignancies: clinical perspective and significance. J Immunother Cancer 6(1): 137.
Brudno et al., (2020) Safety and feasibility of anti-CD19 CAR T cells with fully human binding domains in patients with B-cell lymphoma. Nat Med. Author manuscript; available in PMC Jan. 4, 2021. Published in final edited form as: Nat Med. Feb. 2020; 26(2): 270-280.
Cohen and Varki (2010) The sialome—far more than the sum of its parts. OMICS 14(4): 455-464.
Lahoud et al., (2021) Tumour markers and their utility in imaging of abdominal and pelvic malignancies. Clin Radiol 76(2): 99-107.
Langereis et al., (2015) Complexity and Diversity of the Mammalian Sialome Revealed by Nidovirus Virolectins. Cell Rep 11(12): 1966-1978.
Paul and Padler-Karavani (2018) Evolution of sialic acids: Implications in xenotransplant biology. Xenotransplantation 25(6): e12424.
Pyeon et al., (2015) Abnormally high level of CA-19-9 in a benign ovarian cyst. Obstet Gynecol Sci 58(6): 530-532.

(56) References Cited

OTHER PUBLICATIONS

Safdari et al., (2013) Antibody humanization methods—a review and update. Biotechnol Genet Eng Rev 29: 175-186.
Waldmann (2019) Human Monoclonal Antibodies: The Benefits of Humanization. In: Steinitz, M. (eds) Human Monoclonal Antibodies. Methods in Molecular Biology, vol. 1904. Humana Press, New York, NY. https://doi.org/10.1007/978-1-4939-8958-4_1. pp. 1-10.

GcSLeA

9-O-GcSLeA

FIG. 10

| TMA | Tissue | Control | RA9-23-hIgG |
|---|---|---|---|
| A1 | Melanoma | 0 | 0 |
| A2 | Blank | | |
| A3 | Lung squamous cell carcinoma | 0 | 0 |
| A4 | Lung Adenocarcinoma | 0 | +++ |
| A5 | Lung Neuroendocrine cancer | 0 | 0 |
| A6 | Papillary Thyroid carcinoma | 0 | 0 |
| B1 | Ductal Breast Carcinoma | 0 | 0 |
| B2 | Her2 negative breast carcinoma | 0 | ++ |
| B3 | Endometrial carcinoma | 0 | 0 |
| B4 | Ovarian carcinoma | 0 | 0 |
| B5 | Prostate Adenocarcinoma | 0 | 0 |
| B6 | Seminoma | 0 | 0 |
| C1 | Hepatocellular Carcinoma | 0 | 0 |
| C2 | Renal clear cell carcinoma | 0 | 0 |
| C3 | Diffuse type gastric adenocarcinoma | 0 | 0 |
| C4 | Gastric GIST | 0 | 0 |
| C5 | Pancreatic Adenocarcinoma | 0 | +++ |
| C6 | Colon Adenocarcinoma | 0 | ++ |
| D1 | CLL/SLL lymohoma | 0 | 0 |
| D2 | Follicular lymphoma | 0 | 0 |
| D3 | Extranodal marginal zone lymphoma | 0 | 0 |
| D4 | Mantle cell lymphoma | 0 | 0 |
| D5 | Diffuse large B-cell lymphoma | 0 | 0 |
| D6 | Lymphoblastic lymphoma | 0 | 0 |

ANTIBODIES TO CARBOHYDRATE ANTIGENS

STATEMENT REGARDING SEQUENCE LISTING

The Sequence Listing associated with this application is provided in text format in lieu of a paper copy and is hereby incorporated by reference into the specification. The name of the text file containing the Sequence Listing is 17779720_1_1.txt. The text file is 145 KB, was created on May 25, 2022, and is being submitted electronically via EFS-Web, concurrent with the filing of the specification.

FIELD OF THE INVENTION

The present invention relates to novel monoclonal antibodies or fragments thereof that specifically bind to SLeA carbohydrate antigen, as well as to compositions comprising same and uses thereof.

BACKGROUND OF THE INVENTION

Aberrant glycosylation is one of the hallmarks of cancer resulting in expression of tumor-associated carbohydrate antigens (TACA) that are overexpressed in many types of cancer such as breast, colorectal, ovary, lung, bladder, etc. As potential cancer cell markers, these glycans constitute an important target for development of antibodies as therapeutic and diagnostic tools. Currently, most therapeutic antibodies are against proteins and there are no clinically used anti-glycan antibodies for cancer treatment. The only single antibody targeting TACA that is in clinical use is Dinutuximab, an anti-GD2 antibody for neuroblastoma therapy. Anti-carbohydrate antibodies presumably have low affinity compared to those targeting proteins, and some also have low specificity. Both affinity and specificity are two crucial elements in antibody recognition and are important for clinical applications.

Sialyl Lewis A (SLeA), also known as carbohydrate antigen 19-9 (CA19-9), is a TACA known to be expressed in pancreatic, colorectal, stomach, liver and gall bladder cancers (Ugorski et al., Acta Biochim Pol. 2002; 49: 303-311). Antibody clone, named 1116NS19.9, that recognizes SLeA was developed already in 1979 by Koprowski et al. (Koprowski et al., Somatic Cell Genet. 1979; 5: 957-971). Decades later, this antibody is used in many kits to determine SLeA levels in cancer patients. However, it cannot be used for cancer treatment due to its low affinity.

There are several methods that allow development and improvement of antibodies with high affinity and specificity. These methods include various display systems using phage, ribosome or yeast. Yet, previous attempts to improve affinity of anti-ganglioside (glycosphingolipid with one or more sialic acids linked to the sugar chain) antibodies had only limited success (Zhao et al., 2015, The journal of biological chemistry, 290 (21), pp. 13017-13027). Yeast surface display (YSD) is one of the most successful systems for selection of antibodies targeting an antigen of interest. This system takes advantage of the agglutinin mating proteins (Aga1p and Aga2p) that are normally expressed on the yeast cell surface. These agglutinin proteins are expressed at $10^4$-$10^5$ copies per cell, with Aga1p anchored to the yeast cell wall and Aga2p covalently attached to Aga1p through disulfide bonds. In YSD, an antibody fragment, most commonly, single chain Fv (scFv) or Fab is fused to the Aga2p allowing its cell surface presentation in accordance with the expression of Aga1p/Aga2p proteins. To allow validation of cell surface expression, the antibody fragment carry N-terminal and C-terminal tags.

There is an urgent need for therapeutic agents of high affinity and specificity to TACA, e.g. to SLeA, that is experessed in many cancer types. Such agents could potentially be used for treatment of a wide range of cancer types. Yet, despite the facts that anti-SLeA antibody is known for many years, and that the techniques for antibody improvement are abundant, an antibody of high affinity against SLeA has not been developed thus far.

SUMMARY OF THE INVENTION

The present invention is based on the unexpected observation that several monoclonal antibodies bind Sialyl Lewis A (SLeA) glycans with higher specificity and selectivity than any know antibody to said antigen. It was shown that these monoclonal antibodies can efficiently discriminate between SLeA and its close structural analog SLeX. As SLeA is a tumor-associated carbohydrate antigen, these antibodies, fragments thereof or conjugates thereof may be successfully used in treatment and diagnosis of cancer overexpressing SLeA as well as in monitoring the condition of a cancer patient.

According to one aspect, the present invention provides a monoclonal antibody (mAb) or a fragment thereof that specifically binds to Sialyl Lewis A glycan (SLeA), comprising at least the antigen-binding site, wherein the mAb or the fragment thereof comprises three complementarity determining regions (CDRs) of a heavy-chain variable domain (VH) set forth in SEQ ID NO: 1 and three CDRs of a light-chain variable domain (VL) set forth in SEQ ID NO: 4, wherein CDR2 of the VH of said mAb or said fragment comprises as least one non-conservative substitution in the sequence of heavy-chain CDR2. According to some embodiment, the non-conservative substitution in the heavy chain CDR2 is a substitution at position 61 of SEQ ID NO:1 for an amino acid selected from Asn and Gln. According to some embodiments, the VH domain has an amino acid sequence set forth in SEQ ID NO: 2.

According to certain embodiments, the mAb or fragment thereof comprises a set of six CDR sequences wherein the amino acid sequences of the CDRs of the VH domain are set forth in SEQ ID NOs: 6, 12 and 8, and the amino acid sequences of the CDRs of the VL domain are set forth in SEQ ID NOs: 9, 10 and 11. According to other embodiments, the amino acid sequences of the CDRs of the VH domain are set forth in SEQ ID NOs: 15, 21 and 8, and the amino acid sequences of the CDRs of the VL domain are set forth in SEQ ID NOs: 9, 10, and 11.

According to some embodiments, the mAb or the fragment of the present invention further comprises at least 1, at least 2, at least 3 or at least 4 non-conservative substitutions at framework sequence(s). According to some embodiments, at least 2 of said non-conservative substitutions is for proline amino acid residue. According to some embodiment, the non-conservative substitutions are at a position selected from positions 1, 110, 114 of SEQ ID NO: 2, position 22 of SEQ ID NO: 4 and any combination thereof.

According to some embodiments, the mAb or fragment thereof, comprises (i) a set of six CDR sequences comprising SEQ ID Nos. 15, 21, 8, 9, 10 and 11; (ii) VH framework sequences comprising SEQ ID Nos. 24, 26, 29 and 27; and VL framework sequences comprising SEQ ID Nos. 28, 30, 31 and 32. According to other embodiments, the mAb or fragment thereof, comprises (i) a set of six CDR sequences consisting of SEQ ID Nos. 15, 21, 8, 9, 10 and 11; (ii) VH framework sequences comprising SEQ ID Nos. 24, 26, 29 and 27; and VL framework sequences comprising SEQ ID Nos. 28, 30, 31 and 32. According to yet other embodiments, the mAb or fragment thereof, comprises (i) a set of six CDR sequences consisting of SEQ ID Nos. 15, 21, 8, 9, 10 and 11: (ii) VH framework sequences consisting of SEQ ID Nos. 24, 26, 29 and 27; and VL framework sequences consisting of SEQ ID Nos. 28, 30, 31 and 32.

According to some embodiments, the present invention provides a monoclonal antibody (mAb) that specifically binds to Sialyl Lewis A glycan (SLeA), or a functional fragment thereof, wherein the mAb or the fragment comprises an antigen binding domain comprising a heavy-chain variable domain (VH) and a light-chain variable domain (VL), each comprising three complementarity determining regions (CDRs) and four framework domains (FRs), wherein the VH-CDRs 1, 2 and 3 comprise amino acid sequences SEQ ID NOs: 15, 12, and 8, respectively, the VL-CDRs 1, 2 and 3 comprise amino acid sequences SEQ ID NOs: 9, 10 and 11, respectively, the VH-FR1, 2 and 4 comprises acid sequences SEQ ID NOs: 23, 26 and 27, respectively, and the VL-FR1 comprises acid sequences SEQ ID NO: 28. According to some embodiments, the VH-CDR1 comprises amino acid sequence selected from SEQ ID NO: 6 and 15, and the VH-CDR2 comprises amino acid sequence selected from SEQ ID NO: 12 and 21. According to some embodiments, the present invention provides a mAb or a functional fragment thereof, wherein the CDRs 1, 2, and 3 of the VH domain comprises amino acid sequences SEQ ID NOs: 15, 21 and 8, respectively, the CDRs 1, 2, and 3 of the VL domain comprise amino acid sequences SEQ ID NOs: 9, 10 and 11, the VH-FR 1, 2 and 4 comprise amino acid sequences SEQ ID NOs: 24, 26 and 27, respectively, and the VL-FR1 comprises acid sequences SEQ ID NO: 28. According to some embodiments, the CDRs 1, 2, and 3 of the VH domain consist of amino acid sequences SEQ ID NOs: 15, 21 and 8, respectively, the CDRs 1, 2, and 3 of the VL domain consist of amino acid sequences SEQ ID NOs: 9, 10 and 11, the VH-FR 1, 2 and 4 consist of amino acid sequences SEQ ID NOs: 24, 26 and 27, respectively, and the VL-FR1 consists of acid sequences SEQ ID NO: 28.

According to some embodiment of the present invention, the VH domain of the mAb or of the fragment thereof comprises amino acid sequence SEQ ID NO: 3 and the VL domain comprises amino acid sequence SEQ ID NO: 5.

According to any one of the above embodiments, the fragment is a single chain variable fragment (scFv). Thus, according to some embodiments, the present invention provides a single chain variable fragment of an antibody, wherein the scFv specifically binds to Sialyl Lewis A glycan (SLeA) and comprises a VH domain comprising an amino acid sequence set forth in SEQ ID NO: 3 and VL domain comprising an amino acid sequence set forth in SEQ ID NO: 5. According to some embodiments, the scFv comprises the amino acid sequence set forth in SEQ ID NO: 22, or an analog thereof having at least 90% sequence identity to said sequence.

According to some embodiment, the mAb or the fragment of the present invention further comprises one or more conservative substitution in the framework(s) of the VH domain and/or VL domain, wherein the resulted VH domain has at least 90% sequence identity to SEQ ID NO: 3 and/or the resulted VL domain has at least 90% sequence identity to SEQ ID NO: 5.

According to some embodiments, the present invention provides a mAb or the fragment thereof wherein the VH-CDRs 1, 2 and 3 comprise amino acid sequences SEQ ID NOs: 15, 12, and 8, respectively, the VL-CDRs 1, 2 and 3 comprise amino acid sequences SEQ ID NOs: 9, 10 and 11, respectively, the VH-FR1, 2 and 4 comprises acid sequences SEQ ID NOs: 23, 26 and 27, respectively, and the VL-FR1 comprises acid sequences SEQ ID NO: 28 and wherein the mAb or the fragment further compress one or more conservative substitution in the framework domain selected from VH-FR3, VL-FR2, VL-FR3, VL-FR4 and any combination thereof, wherein the resulted VH domain has at least 90% sequence identity to SEQ ID NO: 3 and/or the resulted VL domain has at least 90% sequence identity to SEQ ID NO: 5.

According to some embodiments, the mAb or the fragment according to the present invention binds SLeA glycan with an equilibrium dissociation constant ($K_D$) of about 0.1 to 30 nM.

According to some embodiments of the present invention, the mAb or the fragment has at least 90% selectivity to SLeA glycan.

The mAb or the fragment according to the present invention is capable of activating T cells, promoting T cells proliferation, generation and/or survival. According to some embodiments, the T-cells are memory, regulatory, helper or natural killer T-cells.

According to some embodiments, the mAb or the fragment of the present invention is a chimeric antibody or fragment. According to some specific embodiments, the chimeric mAb comprises a human constant region and mouse variable regions.

According to another aspect, the present invention provides a cell capable of producing the monoclonal antibody or the antibody fragment of the present invention.

According to some embodiments, the cell is a hybridoma cell. According to other embodiments, the cell is a mammalian cell.

According to another aspect, the present invention provides a conjugate of the mAb or of the fragment thereof. According to some embodiments, the conjugate comprises the mAb or fragments and a moiety. According to some embodiments, the moiety is an anti-cancer active moiety. According to another embodiment, the moiety is a label.

According to another aspect, the present invention provides a nucleic acid molecule encoding at least one chain of the monoclonal antibody or of the fragment of the present invention. According to some embodiment, the nucleic acid encodes an amino acid sequence selected from SEQ ID NO: 3, SEQ ID NO: 5 and both SEQ ID NOs: 3 and 5.

According to some embodiments, the nucleic acid comprises nucleic acid sequence selected from SEQ ID NO: 13, SEQ ID NO: 14, a variant thereof having at least 95% sequence identity to the original sequence(s), and any combination thereof. According to some embodiment, the nucleic acid comprises nucleic acid sequences SEQ ID NO: 13 and 14.

According to another aspect, the present invention provides a nucleic acid construct comprising the nucleic acid of the present invention, operably linked to a promoter.

According to some aspects, the present invention provides a vector comprising the nucleic acid construct or the nucleic acid of the present invention.

According to a further aspect, the present invention provides a cell comprising the nucleic acid, nucleic acid construct or the vector of the present invention.

According to yet another aspect, the present invention provides a pharmaceutical composition comprising the monoclonal antibodies, antibody fragments or conjugates of the present invention, and a pharmaceutically acceptable carrier.

According to some embodiments, the pharmaceutical composition is for use in treating cancer. According to some embodiments, the cancer is a cancer overexpressing SLeA glycan. According to some embodiments, the cancer is selected from breast, ovarian, lung, oropharyngeal cancer, squamous cell carcinoma, pancreatic, colorectal, stomach, liver, head and neck and gallbladder cancer. According to some embodiments, the cancer is lung or pancreatic adenocarcinomas, colon carcinoma or HER2-neg breast carcinoma. Thus, in some embodiments, the present invention provides a pharmaceutical composition comprising a monoclonal antibody of the present invention, a fragment thereof or the conjugate thereof for use in treating cancer. According to some embodiments, the conjugate comprises an anti-cancer moiety. According to some embodiment, the pharmaceutical composition of the present invention is combined with another anti-cancer therapy.

According to a certain aspect, the present invention provides a method for treating cancer in a subject in need thereof comprising administering to the subject a therapeutically effective amount of the antibodies or fragments disclosed herein or of conjugates thereof.

According to another aspect, the present invention provides a method of diagnosing or monitoring cancer in a subject, the method comprising contacting a biological sample of the subject with antibodies, antibody fragments or conjugates of the present invention.

According to some embodiments, the method further comprises assessment of the amount of SLeA in the sample and optionally comparing the amount to a reference. According to some embodiments, the cancer overexpresses SLeA glycan. Thus, detecting overexpression of the SLeA in the subject correlates with the occurrence of cancer in said subject.

According to a further aspect, the present invention provides a kit for diagnosing cancer in a subject comprising antibodies or antibody fragments of the present invention and means for detecting the amount of the antibodies or antibody fragments bound to cells of the biological sample.

BRIEF DESCRIPTION OF DRAWINGS

FIG. 3 shows the structures of AcSLeA (FIG. 3A) and closely related glycans: FIG. 3G—9-O-AcSLeA.

FIG. 4 shows specific binding of full-length RA9 antibodies to SLeA (A columns) and to SLeA-closely related glycans (B-F columns). The Abs were generated based on the selected YSD-clones by conjugation of VH and VL to human IgG1 Fc. The binding was tested by ELISA against different glycan targets (A-F: A—SLeA, B—SLeX, C—LeA, D—LeY, E—LeX, F—Ac-alpha-2-3GalNAc) conjugated to polyacrylamide (PAA), and against PAA control (column G). Relative OD was calculated as percentage of maximal binding of each antibody clone, followed by averaging the relative rank of two independent experiments (mean f SEM).

FIG. 5 shows the specificity of the full-length antibody mutant clone RA9-23 as examined by ELISA inhibition assay against coated SLeA-PAA-Biotin, after pre-incubation of the antibody with specific (SLeA) or non-specific glycans (SLeX and LeA). **** $p<0.001$.

FIG. 6 shows glycan microarray analysis of the native antibody versus the antibody of the present invention (RA9-23) against 88 different glycans (Table 5), demonstrated high specificity against SLeA with a terminal Neu5Ac (AcSLeA; glycan #83) or against SLeA carrying derivatives of the terminal sialic acid (Neu5Gc in glycan #86, GcSLeA; 9-O-acetyl-Neu5Ac in glycan #87, 9-O-AcSLeA; 9-O-acetyl-Neu5Gc in glycan #88, 9-O-GcSLeA), but no binding at all to other glycans on the array.

FIG. 7 shows the affinities (apparent $K_D$) of the native antibody and RA9-23 antibody against the top four binding glycans (as in FIG. 5) by glycan microarray, calculated from saturation curves of 16 serial dilutions of antibodies (ranging at 133.3-0.000853 nM).

FIG. 8 shows the binding of the native antibody and RA9-23 antibody to cancer cell lines and their cytotoxicity. Binding of antibodies (at 10-0.15 ng/μl dilutions) to SLeA-expressing cancer cell lines was tested by FACS. RA9-23 clone shows much better binding to human colorectal cancer cell line WiDr (FIG. 8A) and human pancreatic cancer cell line Capan2 (FIG. 8B) in comparison to the native antibody. RA9-23 antibodies show better killing potential compared to the native antibody as examined by complement-dependent cytotoxicity (CDC). Cytotoxicity against WiDr (FIG. 8C) and Capan2 (FIG. 8D) target cells was determined by LDH detection kit. (representative of two independent experiments; 2-way ANOVA,*, $P<0.05$).

FIG. 9 shows the specificity of binding to cells demonstrated by the treatment of cells with *Arthrobacter Ureafaciens* Sialidase (AUS) that abrogated binding of RA9-23 IgG to SLeA-expressing WiDr cells (FIG. 9D), in comparison to direct binding of the antibody (FIG. 9B), its binding to cells treated with heat-inactivated AUS (FIG. 9C) or a secondary antibody (FIG. 9A).

FIG. 10 shows the summary of staining of different types of cancer tissues (on tissue microarray slide) using RA9-23 antibody indicating for presence of SLeA in lung and pancreatic adenocarcinomas, colon carcinoma and HER2-neg breast carcinoma.

DETAILED DESCRIPTION OF THE INVENTION

Figure 1:
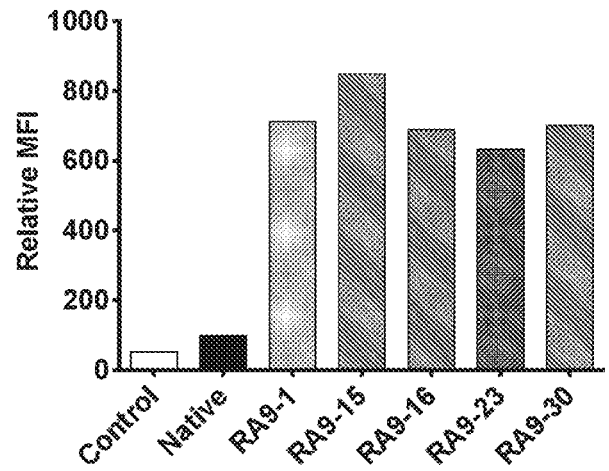
FIG. 1 shows binding of selected five different yeast clones presenting anti-SLeA antibodies from panning cycle 3 compared to the native and secondary antibody control. 0.05 μM SLeA-PAA-biotin was used for panning, and data are presented as mean fluorescence intensity (MFI) relative to the native clone (Bmax is the maximum binding for each antibody, calculated by Prism)

The present invention discloses novel antibodies that specifically bind Sialyl Lewis A glycan (SLeA) with high selectivity and specificity. Interestingly, the disclosed antibodies clearly distinguish between highly similar glycans SLeA and SLeX, having identical carbohydrate building blocks but different linkages between them. The antibodies of the present invention showed higher affinity than the known antibody (1116NS19.9) that recognizes the same antigen 1116NS19.9. The antibodies showed profound cytotoxicity against cancer cells overexpressing SLeA.

According to one aspect, the present invention provides a monoclonal antibody (mAb) or a functional fragment thereof, wherein the mAb or the fragment specifically binds to Sialyl Lewis A glycan (SLeA), wherein said mAb or fragment comprises an antigen binding site comprising three complementarity determining regions (CDRs) of a heavy-chain variable domain (VH) set forth in SEQ ID NO: 1 and three CDRs of a light-chain variable domain (VL) set forth in SEQ ID NO: 4, further comprising as least one non-conservative substitution in the sequence of heavy-chain CDR2.

The term "antibody", "antibodies" and "Ab" are used here interchangeably in its broadest sense and includes monoclonal antibodies (including full length or intact monoclonal antibodies), polyclonal antibodies, multivalent antibodies, multi-specific antibodies (e.g., bi-specific antibodies), and antibody fragment long enough to exhibit the desired biological activity.

Antibodies, or immunoglobulins, comprise two heavy chains linked together by disulfide bonds and two light chains, each light chain being linked to a respective heavy chain by disulfide bonds in a "Y" shaped configuration. Proteolytic digestion of an antibody yields Fv (Fragment variable) and Fc (Fragment crystalline) domains. The term "antigen binding portion", "antigen binding region", "antigen binding site" and "antigen binding domain" are used herein interchangeably and refer to one or more fragments of an antibody that retain the ability to specifically bind to an antigen. The antigen binding domains, Fab, include regions where the polypeptide sequence varies. The term F(ab')2 represents two Fab' arms linked together by disulfide bonds. The central axis of the antibody is termed the Fc fragment. Each heavy chain has at one end a variable domain ($V_H$) followed by a number of constant domains ($C_H$). Each light chain has a variable domain ($V_L$) at one end and a constant domain ($C_L$) at its other end, the light chain variable domain being aligned with the variable domain of the heavy chain and the light chain constant domain being aligned with the first constant domain of the heavy chain (CH1). The variable domains of each pair of light and heavy chains form the antigen-binding site. The domains of the light and heavy chains have the same general structure and each domain comprises four framework regions, whose sequences are relatively conserved, joined by three hyper-variable domains known as complementarity determining regions (CDRs). These domains contribute to specificity and affinity of the antigen-binding site. The isotype of the heavy chain (gamma, alpha, delta, epsilon or mu) determines immunoglobulin class (IgG, IgA, IgD, IgE or IgM, respectively). The light chain is either of two isotypes (kappa (κ) or lambda (λ)) found in all antibody classes. The term "paratope" refers to the antigen binding site of an antibody or fragment thereof.

The terms "monoclonal antibody" and "mAb" are used herein interchangeably and refer to an antibody obtained from a population of substantially homogeneous antibody, i.e., the individual antibody comprising the population are identical except for possible naturally occurring mutations that may be present in minor amounts.

Monoclonal antibodies (mAbs) are highly specific, being directed against a single antigen. Furthermore, in contrast to polyclonal antibody preparations that typically include different antibodies directed against different determinants (epitopes), each monoclonal antibody is directed against a single determinant on the antigen. The modifier "monoclonal" is not to be construed as requiring production of the antibody by any particular method. mAbs may be obtained by methods known to those skilled in the art. For example, the monoclonal antibodies to be used in accordance with the present invention may be made by the Hybridoma method or may also be isolated from phage antibody libraries.

The terms "fragment", "functional fragment" and "antibody fragment" are used herein interchangeably and refer to only a portion of an intact antibody, generally including an antigen-binding site of the intact antibody and thus retaining the ability to bind antigen. The term refers to the antibody as well as to the analog or variant of said antibody. The antibody fragment according to the teaching of the present invention is a function fragment, i.e. preserves the function of the intact antibody. Examples of antibody fragment encompassed by the present definition include: (i) the Fab fragment, having VL, CL, VH and CH1 domains; (ii) the Fab' fragment, which is a Fab fragment having one or more cysteine residues at the C-terminus of the CH1 domain; (iii) the Fd fragment having VH and CH1 domains; (iv) the Fd' fragment having VH and CH1 domains and one or more cysteine residues at the C-terminus of the CH1 domain; (v) the Fv fragment having the VL and VH domains of a single arm of an antibody; (vi) the dAb fragment (Ward et al., Nature 1989, 341, 544-546) which consists of a VH domain; (vii) isolated CDR regions; (viii) F(ab')2 fragments, a bivalent fragment including two Fab' fragments linked by a disulphide bridge at the hinge region; (ix) single chain antibody molecules (e.g. single chain Fv; scFv) (Bird et al., Science 1988, 242, 423-426; and Huston et al., PNAS (USA) 1988, 85,5879-5883); (x) "diabodies" with two antigen binding sites, comprising a heavy chain variable domain (VH) connected to a light chain variable domain (VL) in the same polypeptide chain (see, e.g., EP 404,097; WO 93/11161; and Hollinger et al., Proc. Natl. Acad. Sci. USA, 1993, 90, 6444-6448); (xi) "linear antibodies" comprising a pair of tandem Fd segments (VH-CH1-VH-CH1) which, together with complementary light chain polypeptides, form a pair of antigen binding regions. According to some embodiments, the functional fragment is a scFv.

The terms "light chain variable region", "VL" and "$V_L$" are used herein interchangeably and refer to a light chain variable region of an antibody capable of binding to SLeA glycan. The terms "heavy chain variable region", "VH" and "$V_H$" are used herein interchangeably and refer to a heavy chain variable region of an antibody capable of binding to SLeA glycan.

As used herein, the term "CDR" refers to the complementarity determining region within antibody variable sequences. There are three CDRs in each one of the variable regions of the heavy chain and the light chain, which are designated CDR1, CDR2 and CDR3 (or specifically VH CDR1, VH CDR2, VH CDR3, VL CDR1, VL CDR2, and VL CDR3), for each of the variable regions. The exact boundaries of these CDRs have been defined differently according to different systems. The system described by Kabat (Kabat et al., Sequences of Proteins of Immunological Interest (National Institutes of Health, Bethesda, Md. (1987) and (1991)) not only provides an unambiguous residue numbering system applicable to any variable region of an antibody, but also provides precise residue boundaries defining the three CDRs. Still other CDR boundary definitions may not strictly follow one of the known systems, but will nonetheless overlap with the Kabat CDRs, although they may be shortened or lengthened in light of prediction or experimental findings that particular residues or groups of residues or even entire CDRs do not significantly impact antigen binding. Determination of CDR sequences from antibody heavy and light chain variable regions can be made according to any method known in the art, including but not limited to the methods known as KABAT, Chothia and IMGT. The selected set of CDRs may include sequences identified by more than one method, namely, some CDR sequences may be determined using KABAT and some using IMGT. According to one embodiment, the CDRs are defined using KABAT method.

As used herein, the terms "framework", "framework region" m "framework domain" or "framework sequence" are used herein interchangeably and refer to the remaining sequences of a variable region minus the CDRs. Because the exact definition of a CDR sequence can be determined by different systems, the meaning of a framework sequence is subject to correspondingly different interpretations. The six CDRs also divide the framework regions on the light chain and the heavy chain into four sub-regions (FR1, FR2, FR3 and FR4) on each chain, in which CDR1 is positioned between FR1 and FR2, CDR2 between FR2 and FR3, and CDR3 between FR3 and FR4. Without specifying the particular sub-regions as FR1, FR2, FR3 or FR4, a framework region, as referred by others, represents the combined FR's within the variable region of a single, naturally occurring immunoglobulin chain. As used herein, a FR represents one of the four sub-regions, and FRs represents two or more of the four sub-regions constituting a framework region.

According to some embodiments, the antibody fragment is a single chain variable fragment being a composite polypeptide having antigen binding capabilities and comprising amino acid sequences homologous or analogous to the variable regions of an immunoglobulin light and heavy chain i.e. linked $V_H$-$V_L$, $V_L$-$V_H$ or single chain Fv (scFv).

According to some embodiments, the terms "antibody" or "antibodies" collectively refer to intact antibodies, i.e. monoclonal antibodies (mAbs) and analogs thereof, as well as proteolytic fragments thereof, such as the Fab or F(ab')$_2$ fragments and scFv.

The terms "binds specifically" or "specific for" with respect to an antigen-binding domain of an antibody or of a fragment thereof refers to an antigen-binding domain which recognizes and binds to a specific antigen, but does not substantially recognize or bind other molecules, e.g. in a sample or in vivo. The term encompasses that the antigen-binding domain binds to its antigen with high affinity and binds other antigens with low affinity. An antigen-binding domain that binds specifically to an antigen from one species may bind also to that antigen from another species. This cross-species reactivity is not contrary to the definition of that antigen-binding domain as specific.

The terms "Sialyl Lewis A glycan", "SLe$^a$", SLe$^A$" and "SLeA" are used herein interchangeably and refer to Siaα2-3Gal-β1-3 [Fucα-4]GlcNAc tetrasaccharide carbohydrate also known as antigen 19-9 (CA19-9), and having the structure as presented in structure 1 and schematically presented in Scheme I. This tetrasaccharide can be conjugated to different underlying structures such as carbohydrate(s), protein, lipid, synthetic linker(s) or scaffold(s).

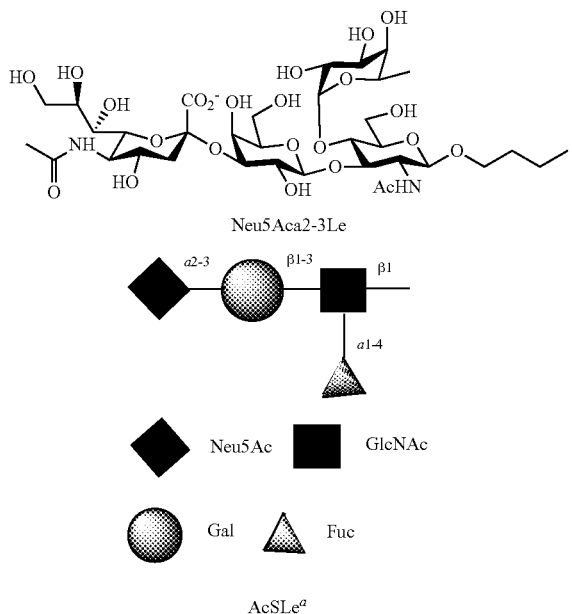

Scheme I

Structure 1

Neu5Acα2-3Le

AcSLe$^a$

The term "non-conservative substitutions", as used herein shall mean the substitution of one amino acid by another which has different properties (i.e, charge, polarity, hydrophobicity, structure). Examples of the non-conservative substitution include substitution of a hydrophobic residue such as isoleucine, valine, leucine, alanine, phenylalanine, tyrosine, tryptophan or methionine for a polar or charged amino acid residue such as lysine, arginine, glutamine, asparagine, aspartate, glutamate, histidine serine, threonine, or cysteine. Likewise, the present disclosure contemplates the substitution of a charged amino acid such as lysine, arginine, histidine, aspartate and glutamate for an uncharged residue including, but not limited to serine, threonine, asparagine, glutamine, or glycine. In certain embodiments, non-conservative substitutions include substitution of an uncharged, hydrophobic amino acid such as leucine with a charged amino acid, such as aspartic acid, lysine, arginine, or glutamate.

According to one embodiment, the present invention provides a monoclonal antibody (mAb) that specifically binds to Sialyl Lewis A glycan (SLeA), said mAb comprises an antigen binding site, wherein the mAb comprises three complementarity determining regions (CDRs) of a heavy-chain variable domain (VH) set forth in SEQ ID NO: 1 and three CDRs of a light-chain variable domain (VL) set forth in SEQ ID NO: 4, wherein as least one amino acid residue of the VH-CDR2 is substituted by a non-conservative substitution. According to another embodiment, the present invention provides a functional fragment of an antibody that specifically binds to Sialyl Lewis A glycan (SLeA), wherein the fragment comprises an antigen binding site comprising three complementarity determining regions (CDRs) of a heavy-chain variable domain (VH) set forth in SEQ ID NO: 1 and three CDRs of a light-chain variable domain (VL) set forth in SEQ ID NO: 4, wherein as least one amino acid residue of the VH-CDR2 is substituted by a non-conservative substitution. According to some embodiments, the fragment is scFv.

According to some embodiments, the VH CDR2 has amino acid sequence SEQ ID NO: 7. According to one embodiment, the non-conservative substitution is in the heavy-chain CDR2 sequence (VH CDR2) set forth in SEQ ID NO: 7. According to other embodiments, the VH CDR2 has amino acid sequence SEQ ID NO: 16. According to one embodiment, the non-conservative substitution is in the heavy-chain CDR2 sequence set forth in SEQ ID NO: 16.

According to some embodiments, the substitution in the VH CDR2 is at position 61 of SEQ ID NO:1 for an amino acid selected from Asn and Gln. According to one embodiment, the VH CDR2 has an amino acid sequence SEQ ID NO: 12. According to one embodiment, the VH CDR2 has an amino acid sequence SEQ ID NO: 21. According to some embodiment, the VH of the mAb or the fragment has the amino acid sequence SEQ ID NO: 2.

According to one embodiment, the CDR1, CDR2 and CDR3 of the VH domain have amino acid sequences SEQ ID NOs: 6, 12 and 8, respectively. According to one embodiment, the CDR1, CDR2 and CDR3 of the VL domain have amino acid sequences SEQ ID NOs: 9, 10 and 11, respectively. According to some embodiments, the CDR1, CDR2 and CDR3 of the VH domain have amino acid sequences SEQ ID NOs: 15, 21 and 8. According to other embodiments, the CDR1, CDR2 and CDR3 of the VL domain have amino acid sequences SEQ ID NOs: 9, 10, and 11.

According to one embodiment, the present invention provides a mAb or a functional fragment thereof, wherein the CDR1, CDR2 and CDR3 of the VH domain have amino acid sequences SEQ ID NOs: 6, 12 and 8, respectively, and the CDR1, CDR2 and CDR3 of the VL domain have amino acid sequences SEQ ID NOs: 9, 10 and 11, respectively. According to another embodiment, the present invention provides a mAb or a functional fragment thereof, wherein the CDR1, CDR2 and CDR3 of the VH domain have amino acid sequences SEQ ID NOs: 15, 21 and 8, respectively, and the CDR1, CDR2 and CDR3 of the VL domain have amino acid sequences SEQ ID NOs: 9, 10, and 11, respectively.

According to any one of the above embodiments, the mAb or the fragment thereof further comprises at least one non-conservative substitutions at the framework sequences of the VH domain and/or of VL domain. According to one embodiment, the mAb or the fragment thereof comprises at least one non-conservative substitutions at framework sequences of the VH domain. According to another embodiment, the mAb or the fragment thereof comprises at least one non-conservative substitutions at framework sequences of the VL domain. According to yet another embodiment, the mAb or the fragment thereof comprises at least one non-conservative substitutions at each one of the framework sequences of the VL and the VH domains. According to other embodiments, the mAb or the fragment thereof comprises at least 2 non-conservative substitutions in framework sequences of the variable region. According to other embodiments, the mAb or the fragment thereof further comprises at least 2 non-conservative substitutions in the framework sequences of the VH domain, of the VL domain or of both VH and VL domains. According to other embodiments, the mAb or the fragment thereof comprises at least 3 non-conservative substitutions in the framework sequences. According to other embodiments, the mAb or the fragment thereof comprises at least 4 non-conservative substitutions in the framework sequences. According to some embodiments, the mAb or the fragment thereof comprises at least 5, 6, 7 or 8 non-conservative substitutions in the framework sequences of either VH, VL or cumulatively in both VH and VL domains. According to some embodiments, at least 2 of said non-conservative substitutions is a substitution for proline amino acid residue. According to some embodiments, the mAb or the fragment thereof comprises from 3 to 8 or 3, 4, 5, 6, 7 or 8 non-conservative substitutions in the framework sequences of either VH, VL or cumulatively in both VH and VL domains. According to some embodiments, the mAb or the fragment thereof comprises from 2 to 5 non-conservative substitutions in the framework sequences of the antigen binding domain. According to some embodiments, the mAb or the fragment thereof comprises 4 non-conservative substitutions in the framework sequences of the antigen binding domain.

According to one embodiment, the mAb or the fragment thereof comprises non-conservative substitutions in at least one position of the positions selected from positions 1, 110, 114 of SEQ ID NO: 2, at position 22 of SEQ ID NO: 4 and any combination thereof. According to one embodiment, the mAb or the fragment thereof comprises non-conservative substitutions in at least one position of the positions selected from positions 1, 110, 114 of SEQ ID NO: 1, at position 22 of SEQ ID NO: 4 and any combination thereof, wherein SEQ ID NO: 1 comprises as least one non-conservative substitution in the sequence of heavy-chain CDR2.

According to one embodiment, the substitution of the amino acid in position 1 of SEQ ID NO: 2 is a substitution for a positively charged amino acid residue. According to one embodiment, the substitution of the amino acid in position 1 of SEQ ID NO: 1 comprising as least one non-conservative substitution in the sequence of heavy-chain CDR2 is a substitution for a positively charged amino acid residue. According to one embodiment, the positively charged amino acid residue is selected from Lys and Arg.

According to one embodiment, the mAb or the fragment thereof comprises non-conservative substitutions at position 110, 114 or both of SEQ ID NO: 2, wherein the substitution is for proline. According to another embodiment, the mAb or the fragment thereof comprises non-conservative substitutions at position 110, 114 or both of SEQ ID NO: 11 comprising as least one non-conservative substitution in the sequence of heavy-chain CDR2, wherein the substitution is for proline.

According to yet another embodiment the mAb or the fragment thereof comprises non-conservative substitutions at position 22 of SEQ ID NO: 4, wherein the substitution is for proline.

According to some embodiments, the present invention provides a monoclonal antibody (mAb) or a fragment thereof that specifically binds to Sialyl Lewis A glycan (SLeA), wherein the mAb or the fragment comprises an antigen binding domain comprising a heavy-chain variable domain (VH) and a light-chain variable domain (VL) each comprising three complementarity determining regions (CDRs) and four framework (FR) domains, wherein the VH-CDRs 1, 2 and 3 comprise amino acid sequences SEQ ID NOs: 15, 12, and 8, respectively, the VL-CDRs 1, 2 and 3 comprise amino acid sequences SEQ ID NOs: 9, 10 and 11, respectively, VH-FR1, 2 and 4 comprises acid sequences SEQ ID NOs: 23, 26 and 27, respectively, and the VL-FR1 comprises acid sequences SEQ ID NO: 28. Exemplary sequences of CDRs and FRs are provided in Tables 1 and 2, respectively.

TABLE 1

Exemplary CDR sequences

| Name | ID number | sequence |
|---|---|---|
| Set 1 VH-CDR 1 | 6 | GFTFSDAWMD |
| Set 2 VH-CDR 1 | 15 | DAWMD |
| Set 1 VH-CDR 2 | 7 | NKGNNHATYYAESVKG |
| Set 1 VH-CDR 2 - mutated | 12 | NKGNNHATNYAESVKG |
| Set 2 VH-CDR 2 | 16 | EIGNKGNNHATYYAESVKG |
| Set 2 VH-CDR 2 - mutated | 21 | EIGNKGNNHATNYAESVKG |
| VH-CDR 3 | 8 | RFAY |
| VL-CDR 1 | 9 | KASQDINSYLS |
| VL-CDR 2 | 10 | RANRLVD |
| VL-CDR 3 | 11 | LOYDEFPRTF |

TABLE 2

Exemplary framework domain sequences

| Name | ID number | sequence |
|---|---|---|
| Set 1 VH-FR1 | 23 | KVKLEESGGGLVQPGGSMKLSCAAS |
| Set 2 VH-FR1 | 24 | KVKLEESGGGLVQPGGSMKLSCAASGFTFS |
| Set 1 VH-FR2 | 25 | WVRQSPEKGLEWVAEIG |
| Set 2 VH-FR2 | 26 | WVRQSPEKGLEWVA |
| VH-FR3 | 29 | RFTVSRDDSKSRVYLQMNSLRVEDTGTYYCTT |
| VH-FR4 | 27 | WGQGTPVTVPA |
| VL-FR1 | 28 | DIKMTQSPSSMYASLGERVTIPC |
| VL-FR2 | 30 | WFQQKPGKSPKTLIY |
| VL-FR3 | 31 | GVPSRFSGSGSGQDYSLTISSLEYEDMGIYYC |
| VL-FR4 | 32 | GGGTKLEIK |

According to some embodiments, the VH-CDR1 comprises amino acid sequence selected from SEQ ID NO; 6 and 15. According to another embodiment, the VH-CDR2 comprises amino acid sequence selected from SEQ ID NO: 12 and 21. According to yet another embodiment, the VH-CDR1 comprises amino acid sequence selected from SEQ ID NO: 6 and 15 and the VH-CDR2 comprises amino acid sequence selected from SEQ ID NO: 12 and 21.

According to some embodiments, VH-CDR1 and 2 comprise amino acid sequences SEQ ID NOs: 15 and 21, respectively and the VH-FRs 1 and 2 comprise amino acid sequences SEQ ID NOs: 24 and 26, respectively.

According to some embodiments, the VH-FR3 comprises amino acid sequence SEQ ID NO: 29. According to one embodiment, the VL-FR2 comprises amino acid sequence SEQ ID NO: 30. According to another embodiment, the VL-FR3 comprises amino acid sequence SEQ ID NO: 31. According to certain embodiments, the the VL-FR4 comprises amino acid sequence SEQ ID NO: 32.

According to some embodiments, the mAb or the fragments thereof comprises VH and VL domains wherein the CDRs 1, 2, and 3 of the VH domain comprises amino acid sequences SEQ ID NOs: 15, 21 and 8, respectively, the CDRs 1, 2, and 3 of the VL domain comprise amino acid sequences SEQ ID NOs: 9, 10 and 11, the VH-FR 1, 2 and 4 comprise amino acid sequences SEQ ID NOs: 24, 26 and 27, respectively, and the VL-FR1 comprises acid sequences SEQ ID NO: 28. According to some embodiments, the CDRs 1, 2, and 3 of the VH domain consist of amino acid sequences SEQ ID NOs: 15, 21 and 8, respectively, the CDRs 1, 2, and 3 of the VL domain consist of amino acid sequences SEQ ID NOs: 9, 10 and 11, the VH-FR 1, 2 and 4 comprise amino acid sequences SEQ ID NOs: 24, 26 and 27, respectively, and the VL-FR1 comprises of acid sequences SEQ ID NO: 28. According to some embodiments, the CDRs 1, 2, and 3 of the VH domain consist of amino acid sequences SEQ ID NOs: 15, 21 and 8, respectively, the CDRs 1, 2, and 3 of the VL domain consist of amino acid sequences SEQ ID NOs: 9, 10 and 11, the VH-FR 1, 2 and 4 consist of amino acid sequences SEQ ID NOs: 24, 26 and 27, respectively, and the VL-FR1 consist of acid sequences SEQ ID NO: 28. According to some embodiments, the mAb or fragment thereof, comprises (i) a set of six CDR sequences comprising SEQ ID Nos. 15, 21, 8, 9, 10 and 11; (ii) a set of four VH framework sequences comprising SEQ ID Nos. 24, 26, 29 and 27; and (iii) a set of four VL framework sequences comprising SEQ ID Nos. 28, 30, 31 and 32.

According to some embodiments, the mAb or the fragments thereof comprises VH and VL domains wherein the CDRs 1, 2, and 3 of the VH domain comprises amino acid sequences SEQ ID NOs: 15, 21 and 8, respectively, the CDRs 1, 2, and 3 of the VL domain comprise amino acid sequences SEQ ID NOs: 9, 10 and 11, the VH-FR 1, 2, 3 and 4 comprise amino acid sequences SEQ ID NOs: 24, 26, 29 and 27, respectively, and the VL-FRs 1, 2, 3 and 4 comprise acid sequences SEQ ID NO: 28, 30, 31 and 32, respectively.

According to one embodiment, the VH domain of the mAb or the fragment of the present invention comprises amino acid sequence SEQ ID NO: 3. According to another embodiment, the VL domain of the mAb or the fragment of the present invention comprises amino acid sequence SEQ ID NO: 5. According to yet another embodiment, the present invention provides a monoclonal antibody comprising a VH domain comprising amino acid sequence SEQ ID NO: 3 and a VL domain comprising amino acid sequence SEQ ID NO: 5. According to a further embodiment, the present invention provides a functional fragment of a monoclonal antibody compositing VH domain comprising amino acid sequence SEQ ID NO: 3 and a VL domain comprising amino acid sequence SEQ ID NO: 5.

According to any one of the above embodiments, the functional fragment is a scFv. According to any one of the above embodiments, the VL and VH domains in the scFv may be in any order, such as N'-VH-VL-C' or N'-VL-VH-C'. According to some embodiments, the VL and VH domains of the scFv are linked by a spacer. The terms "linker" or "spacer" in the context of scFv relates to any peptide capable of connecting two domains of the scFv e.g. variable domains, with its length depending on the kinds of variable domains to be connected. According to some embodiments, the spacer comprises amino acid sequence comprising from 1 to 10 repetitions of amino acid sequence SEQ ID NO: 17. According to some embodiments, the spacer comprises 2, 3, 4, 5, or 6 repetitions of amino acid sequence SEQ ID NO: 17. According to one embodiment, the spacer comprises amino acid sequence comprising 3 repetitions of amino acid sequence SEQ ID NO: 17. According to some embodiment, spacer comprises amino acid sequence SEQ ID NO: 19. According to one embodiment, the present invention provides a scFv compositing VH domain comprising amino acid sequence SEQ ID NO: 3 and a VL domain comprising amino acid sequence SEQ ID NO: 5. According to one embodiment, the scFv comprises amino acid sequence SEQ ID NO: 22. According to another embodiments, the scFv comprises an analog of amino acid sequence SEQ ID NO: 22 having at least 90%, at least 92%, at least 95% or at least 98% sequence identity to it. According to one embodiment, the scFv consists of amino acid sequence SEQ ID NO: 22.

According to any one of the aspects and embodiments of the invention, when referring to antibody or fragment thereof, the terms "comprising the amino acid sequence set forth in SEQ ID NO: X", "comprising SEQ ID NO: X" and "having SEQ ID NO: X" are used herein interchangeably. The terms "consisting of the amino acid sequence set forth in SEQ ID NO: X", "consisting of SEQ ID NO: X" and "of SEQ ID NO: X" are used herein interchangeably.

The same rule holds for nucleic acid sequence. Thus the terms "nucleic acid comprising the nucleic acid sequence set forth in SEQ ID NO: X", "nucleic acid comprising SEQ ID NO: X" and "nucleic acid having SEQ ID NO: X" are used herein interchangeably. The terms "nucleic acid consisting of the nucleic acid sequence set forth in SEQ ID NO: X", "nucleic acid consisting of SEQ ID NO: X" and "nucleic acid of SEQ ID NO: X" are used herein interchangeably.

The terms "comprising", "comprise(s)", "include(s)", "having", "has" and "contain(s)," are used herein interchangeably and have the meaning of "consisting at least in part of". When interpreting each statement in this specification that includes the term "comprising", features other than that or those prefaced by the term may also be present. Related terms such as "comprise" and "comprises" are to be interpreted in the same manner. The terms "have", "has", "having" and "comprising" also encompass the meaning of "consisting of" and "consisting essentially of", and may be substituted by these terms. Thus, according to any aspect or embodiment of the present invention the statement such as VH or VL comprising amino acid sequence X has also the meaning that the VH or VL consist of amino acid sequence X.

According to some embodiments, the present invention provides a mAb or an antibody fragment thereof, comprising a VH domain consisting of amino acid sequence SEQ ID NO: 3. According to another embodiment, the VL domain of the mAb or the fragment of the present invention consists of amino acid sequence SEQ ID NO: 5. According to yet another embodiment, the present invention provides a monoclonal antibody comprising VH domain consisting of amino acid sequence SEQ ID NO: 3 and a VL domain consisting of amino acid sequence SEQ ID NO: 5. According to a further embodiment, the present invention provides a functional fragment of an antibody compositing VH domain consisting of amino acid sequence SEQ ID NO: 3 and a VL domain consisting of amino acid sequence SEQ ID NO: 5. According to one embodiment, the functional fragment is a scFv.

According to any one of the above embodiments, the mAb or the fragment further comprises at least one conservative substitution in the framework(s) of the VH domain and/or VL domain, i.e. being a conservative analog of the mAb or of the functional fragment of the present invention, wherein the analog has at least 90% sequence identity the said mAb or fragment. According to one embodiment, the substitution is not at positions 1, 110, 114 of SEQ ID NO: 3 and not at position 22 of SEQ ID NO: 5.

According to one embodiment, the present invention provides a mAb or a functional fragment thereof further comprising at least one conservative substitution in the framework(s) of the VH domain wherein the resulted VH domain has at least 90% sequence identity to SEQ ID NO: 3 and the VL domain comprises amino acid sequence SEQ ID NO: 5. According to one embodiment, the present invention provides a mAb or a functional fragment thereof further comprising at least one conservative substitution in the framework(s) of the VL domain, wherein the resulted VL domain has at least 90% sequence identity to SEQ ID NO: 5 and the VH domain comprises amino acid sequence SEQ ID NO: 3. According to a further embodiment, the present invention provides a mAb or a functional fragment thereof further comprising at least one conservative substitution in the frameworks of the VH and of the VL domains, wherein the resulted VH domain has at least 90% sequence identity to SEQ ID NO: 3 and the resulted VL domain has at least 90% sequence identity to SEQ ID NO: 5. According to some embodiments, the VH domain comprising such conservative substitution(s) has at least 91%, at least 92%, at least 93%, at least 94%, at least 95%, at least 96%, at least 97%, at least 98%, at least 99% sequence identity to SEQ ID NO: 3. According to other embodiments, the VL domain comprising such conservative substitution(s) has at least 91%, at least 92%, at least 93%, at least 94%, at least 95%, at least 96%, at least 97%, at least 98%, at least 99% sequence identity to SEQ ID NO: 5. According to one embodiment, the substitution is not at positions 1, 110, 114 of SEQ ID NO: 3 and not at position 22 of SEQ ID NO: 5. The term "conservative substitution" as used herein denotes the replacement of an amino acid residue by another, without altering the overall conformation and biological activity of the peptide, including, but not limited to, replacement of an amino acid with one having similar properties (such as, for example, polarity, hydrogen bonding potential, acidic, basic, shape, hydrophobic, aromatic, and the like). Amino acids with similar properties are well known in the art. For example, according to one table known in the art, the following six groups each contain amino acids that are conservative substitutions for one another: (1) Alanine (A), Serine (S), Threonine (T); (2) Aspartic acid (D), Glutamic acid (E); (3) Asparagine (N), Glutamine (Q); (4) Arginine (R), Lysine (K); (5) Isoleucine (I), Leucine (L), Methionine (M), Valine (V); and (6) Phenylalanine (F), Tyrosine (Y), Tryptophan (W).

According to any one of the above embodiments, the mAb or the fragment of the present invention binds SLeA glycan with an equilibrium dissociation constant ($K_D$) of about 0.01 to 100 nM. According to one embodiment, the mAb or the fragment of the present invention binds SLeA glycan with an equilibrium dissociation constant ($K_D$) of about 0.05 to 80 nM, about 0.075 to 60 nM.

According to one embodiment, the mAb or the fragment of the present invention binds SLeA glycan with an equilibrium dissociation constant ($K_D$) of about 0.1 to 30 nM. According to some embodiments, the monoclonal antibody or the functional fragment thereof, such as scFv, comprises a VH domain comprising amino acid sequence SEQ ID NO: 3 and a VL domain comprising amino acid sequence SEQ ID NO: 5. The term "$K_D$", as used herein, is intended to refer to the dissociation constant of a particular antibody-antigen interaction. $K_D$ is calculated by $k_a/k_d$. The term "$k_{on}$" or "$k_a$", as used herein, is intended to refer to the on rate constant for association of an antibody to the antigen to form the antibody/antigen complex. The term "$k_{off}$" or "$k_d$", as used herein, is intended to refer to the off rate constant for dissociation of an antibody from the antibody/antigen complex.

According to some embodiments, the inhibitions constant (Ki) of the mAb of the present invention or of the fragment thereof is from 30 to 500 nM, from 40 to 300 nM, from 50 to 200 nM or from 50 to 150 nM.

According to any one of the above embodiments, the selectivity (i.e. selectivity in cross reaction) of the mAb or the fragment of the present invention to SLeA glycan is at least 90%. As used herein, the term "selectivity" for an antibody refers to an antibody that binds to a certain carbohydrate antigen but not to closely structurally related carbohydrates. Thus, selectivity of 90% means that the mAb or fragments thereof binds to SLeA in 90% of the cases in a cross reaction test as shown in the Examples, e.g. by glycan microarray, FACS or by ELISA inhibition assay. According to another embodiment, the selectivity in cross reaction is at least 95% or at least 98%. According to one embodiment, the closely structurally related carbohydrate is SLeX. According to one embodiment, the selectivity in cross reaction to SLeA glycan versus SLeX glycan is at least 97% or at least 98%. According to some embodiments, the monoclonal antibody or the functional fragment thereof such as scFv comprises a VH domain comprising amino acid sequence SEQ ID NO: 3 and a VL domain comprising amino acid sequence SEQ ID NO: 5.

According to some embodiments, the mAb or the fragment of the present invention binds SLeA glycan with an equilibrium dissociation constant ($K_D$) of about 0.01 to 100 nM and has selectivity to SLeA glycan in cross reaction versus SLeX glycan of at least 97% or at least 98%. According to some embodiments, the monoclonal antibody or the functional fragment thereof such as scFv comprises a VH domain comprising amino acid sequence SEQ ID NO: 3 and a VL domain comprising amino acid sequence SEQ ID NO: 5. According to some embodiments, the fragment is a single chain variable fragment (scFv).

According to any one of the above embodiments, the mAb of the present invention or the functional fragment thereof is capable of activating T cells. According to one embodiment, the mAb of the present invention of the functional fragment thereof is capable of promoting T cells proliferation, generation and/or survival. According to some embodiments, the T-cells are selected from memory, regulatory, helper and natural killer T-cells. As used herein, the term "T cell activation" or "activation of T cells" refers to a cellular process in which mature T cells, which express antigen-specific T cell receptors on their surfaces, recognize their cognate antigens and respond by entering the cell cycle, secreting cytokines or lytic enzymes, and initiating or becoming competent to perform cell-based effector functions. Activation results in clonal expansion of T cells, upregulation of activation markers on the cell surface, differentiation into effector cells, induction of cytotoxicity or cytokine secretion, induction of apoptosis, or a combination thereof. As used herein, "improving cell survival" and "promoting cell survival" refers to an increase in the number of cells that survive a given condition or period, as compared to a control, e.g., the number of cells that would survive the same conditions in the absence of treatment. Conditions can be in vitro, in vivo, ex vivo, or in situ. Improved cell survival can be expressed as a comparative value, e.g., twice as many cells survive if cell survival is improved two-fold. Improved cell survival can result from a reduction in apoptosis, an increase in the life-span of the cell, or an improvement of cellular function and condition.

In some embodiments, cell proliferation, survival or activation is improved by 5, 10, 20, 30, 40, 50, 60, 70, 80, 90 or 100%, as compared to control levels. In some embodiments, cell survival is by two-, three-, four-, five-, or ten-fold of control levels.

According to any one of the above embodiments, the mAb or the fragment thereof is a chimeric antibody or fragment thereof. According to one embodiment, the chimeric antibody comprising fragments of human and non-human mammal antibodies. According to other embodiments, the functional fragment of the present invention is a chimera comprising fragments of human and non-human mammal antibodies. According to one embodiment, the functional fragment is a scFv. According to one embodiment, the non-human mammal is selected from the group consisting of a mouse, rat, rabbit, goat, ape, and monkey.

According to any one of the above embodiments, the heavy chain of the mAb or the fragment of the present invention has a structure selected from the of IgG, IgA, IgD, IgE or IgM class (type). According to one embodiment, the mAb has an IgG structure. According to one embodiment, the heavy chain constant region is selected from the group consisting of: human IgG1, human IgG2, human, IgG3, human IgG4, mouse IgG1, mouse IgG2a, mouse IgG2b, mouse IgG3. According to other embodiments, the light chain constant region is selected from kappa and lambda.

According to some embodiments, the present invention provides a conjugate of the mAb or of the fragment of the present invention. The term "conjugate" as used herein refers to the association of an antibody or a fragment thereof with another moiety. According to some embodiments, the moiety is a tag or label and the conjugate comprises a label. The term "tag" or "label" refers to a moiety which is attached, conjugated, linked or bound to, or associated with a compound such as the antibody or antibody fragment of the present invention and which may be used as a means of, for example, identifying, detecting and/or purifying the a compound. Tags or labels include haemagglutinin tag, myc tag, poly-histidine tag, protein A, glutathione S transferase, Glu-Glu affinity tag, substance P, FLAG peptide, biotin and streptavidin binding peptide, enzyme, GFP, and rodamine. According to some embodiments, the label is a fluorescent label.

The term "moiety" as used herein refers to a part of a molecule, which lacks one or more atom(s) compared to the corresponding molecule. The term "moiety", as used herein, further relates to a part of a molecule that may include either whole functional groups or parts of functional groups as substructures.

According to some embodiments, the moiety is an active moiety. The term "active agent" and "active moiety" are used herein interchangeably and refer to an agent that has biological activity, pharmacologic effects and/or therapeutic utility.

According to some embodiments, the active moiety is an anti-cancer moiety. The term "anti-cancer", "anti-neoplastic" and "anti-tumor" when referred to a compound, an agent or a moiety are used herein interchangeably and refer to a compound, drug, antagonist, inhibitor, or modulator such as immunomodulatory having anticancer properties or the ability to inhibit or prevent the growth, function or proliferation of and/or causing destruction of cells," and in particular tumor cells. Therapeutic agents suitable in an anti-neoplastic composition for treating cancer include, but not limited to, chemotherapeutic agents, radioactive isotopes, toxins, cytokines such as interferons, immunostimulating agents, immunomodulating agents and antagonistic agents targeting cytokines, cytokine receptors or antigens associated with tumor cells. In some embodiments, an anti-cancer agent is a chemotherapeutic. Thus according to some embodiments, the present invention provides a conjugate of the mAb present invention and an anti-cancer moiety such as chemotherapeutic agents, radioactive isotopes, toxins, cytokines such as interferons, immunostimulating agents, immunomodulating agents and antagonistic agents targeting cytokines, cytokine receptors or antigens associated with tumor cells. According to another embodiment, the present invention provides a conjugate of the fragment of the mAb of the present invention and the anti-cancer moiety. According to some embodiments, the mAb or the fragment comprises a VH comprising amino acid sequence SEQ ID NO: 3 and a VL comprising amino acid sequence SEQ ID NO: 5.

According to another aspect, the present invention provides a cell capable of producing or expressing or that produces or expresses the monoclonal antibody or the antibody fragment of the present invention. All embodiments and definitions used in any one of the above aspects apply herein as well. According to one embodiment, the present invention provides a cell capable of producing a monoclonal antibody (mAb) that specifically binds to Sialyl Lewis A glycan (SLeA), wherein the mAb comprises an antigen binding site comprising three complementarity determining regions (CDRs) of a heavy-chain variable domain (VH) set forth in SEQ ID NO: 1 and three CDRs of a light-chain variable domain (VL) set forth in SEQ ID NO: 4, and further comprising as least one non-conservative substitution in the sequence of heavy-chain CDR2. According to another embodiment, the cell is capable of producing functional fragments of an antibody that specifically binds to Sialyl Lewis A glycan (SLeA), said fragments comprise an antigen binding site comprising three complementarity determining regions (CDRs) of a heavy-chain variable domain (VH) set forth in SEQ ID NO: 1 and three CDRs of a light-chain variable domain (VL) set forth in SEQ ID NO: 4, further comprising as least one non-conservative substitution in the sequence of heavy-chain CDR2. According to some embodiments, the monoclonal antibody or the functional fragment thereof, such as scFv, comprise a VH domain comprising amino acid sequence SEQ ID NO: 3 and a VL domain comprising amino acid sequence SEQ ID NO: 5. According to some embodiments, the mAb or a functional fragment thereof further comprising at least one conservative substitution in the framework(s) of the VH domain and/or VL domain wherein the resulted VH domain has at least 95% sequence identity to SEQ ID NO: 3 and/or the resulted VH domain has at least 95% sequence identity to SEQ ID NO: 5. According to some embodiment, the cell is selected from bacterial, fungi such as yeast and mammalian cell. According to one embodiment, the cell is a Hybridoma cell.

According to another aspect, the present invention provides nucleic acid molecule encoding at least one chain of the monoclonal antibody or of the fragment of the present invention. All embodiments and definitions used in any one of the above aspects apply herein as well. According to one embodiment, the nucleic acid molecule encodes at least one chain of the monoclonal antibody (mAb) that specifically binds to Sialyl Lewis A glycan (SLeA), wherein the mAb comprises an antigen binding site comprising three complementarity determining regions (CDRs) of a heavy-chain variable domain (VH) having amino acid sequence SEQ ID NO: 1 and three CDRs of a light-chain variable domain (VL) having amino acid sequence SEQ ID NO: 4, further comprising as least one non-conservative substitution in the sequence of heavy-chain CDR2. According to another embodiment, the nucleic acid molecule encodes at least one chain of the monoclonal antibody comprising VH domain comprising amino acid sequence SEQ ID NO: 3 and a VL domain comprising amino acid sequence SEQ ID NO: 5. According to some embodiments, the nucleic acid molecule encodes at least one chain of the functional fragment of the monoclonal antibody (mAb) that specifically binds to Sialyl Lewis A glycan (SLeA), wherein the fragment comprises an antigen binding site comprising three complementarity determining regions (CDRs) of a heavy-chain variable domain (VH) having amino acid sequence SEQ ID NO: 1 and three CDRs of a light-chain variable domain (VL) having amino acid sequence SEQ ID NO: 4, further comprising as least one non-conservative substitution in the sequence of heavy-chain CDR2. According to another embodiment, the nucleic acid molecule encodes at least one chain of the functional fragment comprising a VH domain comprising amino acid sequence SEQ ID NO: 3 and a VL domain comprising amino acid sequence SEQ ID NO: 5. According to one embodiment, the fragment is a scFv. According to one embodiment, the nucleic acid molecule encodes scFv comprising VH domain comprising amino acid sequence SEQ ID NO: 3 and a VL domain comprising amino acid sequence SEQ ID NO: 5. According to one embodiment, the nucleic acid molecule encodes both SEQ ID NO: 3 and SEQ ID NO: 5.

According to one embodiment, the nucleic acid molecule comprises nucleic acid sequence SEQ ID NOs: 13 or a variant thereof having at least 95% sequence identity to the original sequence. According to another embodiment, the nucleic acid molecule comprises comprising nucleic acid sequence SEQ ID NOs: 14 or a variant thereof having at least 95% sequence identity to the original sequence. According to a further embodiment, the nucleic acid molecule comprises nucleic acid sequences SEQ ID NOs: 13 and 14 or a variant thereof having at least 95% sequence identity to the original sequence.

The terms "homolog" "variant", "DNA variant", "sequence variant" and "polynucleotide variant" are used herein interchangeably and refer to a DNA polynucleotide having at least 70% sequence identity to the parent polynucleotide. The variant may include mutations such as deletion, addition or substitution such that the mutations do not change the open reading frame and the polynucleotide encodes a peptide or a protein having substantially similar structure and function as a peptide or a protein encoded by the parent polynucleotide. According to some embodiments, the variants are conservative variants. The term "conservative variants" as used herein refers to variants in which a change of one or more nucleotides in a given codon position results in no alteration in the amino acid encoded at that position. Thus, the peptide or the protein encoded by the conservative variants has 100% sequence identity to the peptide or the protein encoded by the parent polynucleotide.

According to some embodiments, the variant is a non-conservative variant encoding to a peptide or a protein being a conservative analog of the peptide of the protein encoded by the parent polynucleotide. According to some embodiments, the variant has at least 75%, at least 80% at least 85%, at least 90%, at least 95%, at least 98% or at least 99% sequence identity to the original nucleic acid sequence. According to one embodiment, the variant is a conservative variant.

According to another aspect, the present invention provides a nucleic acid construct comprising the nucleic acid of the present invention, operably linked to a promoter. According to one embodiment, the nucleic acid construct comprises a nucleic acid molecule comprising nucleic acid sequence SEQ ID NOs: 13 or a variant thereof having at least 95% sequence identity to the original sequence(s) operably bound to a promoter. According to another embodiment, the present invention provides a nucleic acid construct comprising nucleic acid molecule comprising nucleic acid sequence SEQ ID NOs: 14 or a variant thereof having at least 95 sequence identity to the original sequence(s), operably bound to a promoter. According to a further embodiment, the nucleic acid construct comprises a nucleic acid molecule comprising nucleic acid sequences SEQ ID NOs:

13 and 14 or a derivative thereof having at least 95% sequence identity to the original sequence(s) operably linked to a promoter.

The terms "operably linked", "operatively linked", "operably encodes", "operably bound" and "operably associated" are used herein interchangeably and refer to the functional linkage between a promoter and nucleic acid sequence, wherein the promoter initiates transcription of RNA corresponding to the DNA sequence. A heterologous DNA sequence is "operatively associated" with the promoter in a cell when RNA polymerase which binds the promoter sequence transcribes the coding sequence into mRNA which then in turn is translated into the protein encoded by the coding sequence.

The term "promoter" as used herein refers to a regulatory sequence that initiates transcription of a downstream nucleic acid. The term "promoter" refers to a DNA sequence within a larger DNA sequence defining a site to which RNA polymerase may bind and initiate transcription. A promoter may include optional distal enhancer or repressor elements. The promoter may be either homologous, i.e., occurring naturally to direct the expression of the desired nucleic acid, or heterologous, i.e., occurring naturally to direct the expression of a nucleic acid derived from a gene other than the desired nucleic acid. A promoter may be constitutive or inducible. A constitutive promoter is a promoter that is active under most environmental and developmental conditions. An inducible promoter is a promoter that is active under environmental or developmental regulation, e.g., upregulation in response to xylose availability. Promoters may be derived in their entirety from a native gene, may comprise a segment or fragment of a native gene, or may be composed of different elements derived from different promoters found in nature, or even comprise synthetic DNA segments. It is understood by those skilled in the art that different promoters may direct the expression of a gene in different tissues or cell types, or at different stages of development, or in response to different environmental or physiological conditions. It is further understood that the same promoter may be differentially expressed in different tissues and/or differentially expressed under different conditions.

According to another aspect, the present invention provides a vector comprising the nucleic acid molecule or nucleic acid construct of the present invention. The terms "vector" and "expression vector" are used herein interchangeably and refer to any viral or non-viral vector such as plasmid, virus, retrovirus, bacteriophage, cosmid, artificial chromosome (bacterial or yeast), phage, binary vector in double or single stranded linear or circular form, or nucleic acid, sequence which is able to transform host cells and optionally capable of replicating in a host cell. The vector may be integrated into the cellular genome or may exist extrachromosomally (e.g., autonomous replicating plasmid with an origin of replication). The vector may contain an optional marker suitable for use in the identification of transformed cells, e.g., tetracycline resistance or ampicillin resistance. A cloning vector may or may not possess the features necessary for it to operate as an expression vector. Any vector known in the art is envisioned for use in the practice of this invention. According to other embodiments, the vector is a virus, e.g. a modified or engineered virus. The modification of a vector may include mutations, such as deletion or insertion mutation, gene deletion or gene inclusion. In particular, a mutation may be done in one or more regions of the viral genome. Such mutations may be introduced in a region related to internal structural proteins, replication, or reverse transcription function. Other examples of vector modification are deletion of certain genes constituting the native infectious vector such as genes related to the virus' pathogenicity and/or to its ability to replicate. Any virus can be attenuated by the methods disclosed herein. According to some embodiments, the vector is a virus selected from lentivirus, adenovirus, modified adenovirus and retrovirus. In one particular embodiment, the vector is lentivirus. According to other embodiments, the vector is a plasmid.

According to a further aspect, the present invention provides a cell comprising the mAb or the fragment thereof, the nucleic acid, or the nucleic acid construct of the present invention. According to one embodiment, the cell is selected from a bacterial, fungi or mammal cell. According to some embodiments, such cell is capable of expressing the mAb of the fragment of the present invention. According to some embodiments, such a cell expresses the mAb of the fragment of the present invention.

According to another aspect, the present invention provides a pharmaceutical composition comprising the monoclonal antibody, the antibody fragment or the conjugate of the present invention, and a pharmaceutically acceptable carrier. According to one embodiment, the pharmaceutical composition comprises a plurality of the monoclonal antibodies of the present invention, and a pharmaceutically acceptable carrier. According to another embodiment, the pharmaceutical composition comprises a plurality of antibody fragments of the present invention, and a pharmaceutically acceptable carrier. According to yet another embodiment, the pharmaceutical composition comprises the conjugates of the present invention, and a pharmaceutically acceptable carrier. According to yet one embodiment, the pharmaceutical composition comprises the a plurality of cells of the present invention, and a pharmaceutically acceptable carrier. All embodiments and definitions used in any one of the above aspects and embodiments apply herein as well.

The term "pharmaceutical composition" as used herein refers to a composition comprising at least one active agent as disclosed herein formulated together with one or more pharmaceutically acceptable carriers.

Formulation of the pharmaceutical composition may be adjusted according to applications. In particular, the pharmaceutical composition may be formulated using a method known in the art so as to provide rapid, continuous or delayed release of the active ingredient after administration to mammals. For example, the formulation may be any one selected from among plasters, granules, lotions, liniments, lemonades, aromatic waters, powders, syrups, ophthalmic ointments, liquids and solutions, aerosols, extracts, elixirs, ointments, fluidextracts, emulsions, suspensions, decoctions, infusions, ophthalmic solutions, tablets, suppositories, injections, spirits, capsules, creams, troches, tinctures, pastes, pills, and soft or hard gelatin capsules.

The pharmaceutical compositions of the present invention may be prepared by conventional techniques, e.g., as described in Remington: The Science and Practice of Pharmacy, 19th Ed., 1995. The compositions may be in solid, semisolid or liquid form and may further include pharmaceutically acceptable fillers, carriers or diluents, and other inert ingredients and excipients. The compositions can be administered by any suitable route, e.g., orally, intravenously, parenterally, rectally or transdermally, the oral route being preferred. The dosage will depend on the state of the patient, and will be determined as deemed appropriate by the practitioner.

The term "pharmaceutically acceptable carrier" or "pharmaceutically acceptable excipient" as used herein refers to any and all solvents, dispersion media, preservatives, antioxidants, coatings, isotonic and absorption delaying agents, surfactants, fillers, disintegrants, binders, diluents, lubricants, glidants, pH adjusting agents, buffering agents, enhancers, wetting agents, solubilizing agents, surfactants, antioxidants the like, that are compatible with pharmaceutical administration. The use of such media and agents for pharmaceutically active substances is well known in the art. The compositions may contain other active compounds providing supplemental, additional, or enhanced therapeutic functions, solid carriers or excipients such as, for example, lactose, starch or talcum or liquid carriers such as, for example, water, fatty oils or liquid paraffins.

Solutions or suspensions used for parenteral, intradermal, or subcutaneous application typically include the following components: a sterile diluent such as water for injection, saline solution, fixed oils, polyethylene glycols, glycerine, propylene glycol (or other synthetic solvents), antibacterial agents (e.g., benzyl alcohol, methyl parabens), antioxidants (e.g., ascorbic acid, sodium bisulfite), chelating agents (e.g., ethylenediaminetetraacetic acid), buffers (e.g., acetates, citrates, phosphates), and agents that adjust tonicity (e.g., sodium chloride, dextrose). The pH can be adjusted with acids or bases, such as hydrochloric acid or sodium hydroxide, for example. The parenteral preparation can be enclosed in ampules, disposable syringes or multiple dose glass or plastic vials.

Pharmaceutical compositions adapted for parenteral administration include, but are not limited to, aqueous and non-aqueous sterile injectable solutions or suspensions, which can contain antioxidants, buffers, bacteriostats and solutes that render the compositions substantially isotonic with the blood of an intended recipient. Such compositions can also comprise water, alcohols, polyols, glycerine and vegetable oils, for example. Extemporaneous injection solutions and suspensions can be prepared from sterile powders, granules and tablets. Such compositions preferably comprise a therapeutically effective amount of a compound of the invention and/or other therapeutic agent(s), together with a suitable amount of carrier so as to provide the form for proper administration to the subject.

According to one embodiment, the pharmaceutical composition comprises the mAb or the fragment of the present invention that binds specifically to SLeA comprising VH domain comprising amino acid sequence SEQ ID NO: 3 and a VL domain comprising amino acid sequence SEQ ID NO: 5. According to some embodiments, the pharmaceutical composition comprises a conjugate of said mAb or fragment thereof. According to one embodiment, the composition comprises a nucleic acid or nucleic acid construct according to the present invention. According to some embodiment, the pharmaceutical composition comprises a cell according to the present invention, and a pharmaceutically acceptable carrier. According to one embodiment, the cell comprises a mAb or the fragment of the present invention that binds specifically to SLeA comprising VH domain comprising amino acid sequence SEQ ID NO: 3 and a VL domain comprising amino acid sequence SEQ ID NO: 5. According to another embodiment, the cell comprises a nucleic acid encoding said mAb or fragment.

According to some embodiments, the composition is formulated for a parenteral administration. According to one embodiment, the composition is formulated for subcutaneous, intraperitoneal (IP), IM, IV or intratumor administration. According to other embodiments, the composition is formulated as a solution such as a sterile solution for injection.

According to any one of the above embodiments, the pharmaceutical composition of the present invention is for use in treating cancer. According to some embodiments, the cancer is a cancer overexpressing SLeA glycan. According to one embodiment, the cancer is selected from hematological, breast, ovarian, pancreatic, colorectal, stomach, head and neck, liver, lung, oropharyngeal cancer, squamous cell carcinoma and gallbladder cancer. According to one embodiment, the cancer is a breast cancer. According to some embodiment, the cancer is a Her-2 negative breast carcinoma. According to another embodiment, the cancer is an ovarian cancer. According to a further embodiment, the cancer is a colon cancer. According to one embodiment, the cancer is colon adenocarcinoma. According to one embodiment, the cancer is a colorectal cancer. According to another embodiment, the cancer is a stomach cancer. According to one embodiment, the cancer is a pancreatic cancer. According to one embodiment, the cancer is carcinoma. According to one embodiment, the cancer is a hematological cancer overexpressing SLeA glycan. According to another embodiment, the cancer is a pancreatic adenocarcinoma. According to yet another embodiment, the cancer is lung cancer. According to one embodiment, the cancer is lung adenocarcinoma. According to some embodiments, the cancer is squamous cell carcinoma. According to another embodiment, the cancer is pharynx squamous cell carcinoma. According to some embodiments, the use comprises administering the pharmaceutical composition to a subject.

The term "treating" a condition or patient refers to taking steps to obtain beneficial or desired results, including clinical results. Beneficial or desired clinical results include, but are not limited to, or ameliorating abrogating, substantially inhibiting, slowing or reversing the progression of a disease, condition or disorder, substantially ameliorating or alleviating clinical or esthetical symptoms of a condition, substantially preventing the appearance of clinical or esthetical symptoms of a disease, condition, or disorder, and protecting from harmful or annoying symptoms. Treating further refers to accomplishing one or more of the following: (a) reducing the severity of the disorder; (b) limiting development of symptoms characteristic of the disorder(s) being treated; (c) limiting worsening of symptoms characteristic of the disorder(s) being treated; (d) limiting recurrence of the disorder(s) in patients that have previously had the disorder(s); and/or (e) limiting recurrence of symptoms in patients that were previously asymptomatic for the disorder(s).

The term "treating cancer" as used herein should be understood to e.g. encompass treatment resulting in a decrease in tumor size; a decrease in rate of tumor growth; stasis of tumor size; a decrease in the number of metastasis; a decrease in the number of additional metastasis; a decrease in invasiveness of the cancer, a decrease in the rate of progression of the tumor from one stage to the next; inhibition of tumor growth in a tissue of a mammal having a malignant cancer; control of establishment of metastases; inhibition of tumor metastases formation; regression of established tumors as well as decrease in the angiogenesis induced by the cancer, inhibition of growth and proliferation of cancer cells and so forth. The term "treating cancer" as used herein should also be understood to encompass prophylaxis such as prevention as cancer reoccurs after previous treatment (including surgical removal) and prevention of cancer in an individual prone (genetically, due to life style, chronic inflammation and so forth) to develop cancer. As used herein, "prevention of cancer" is thus to be understood to include prevention of metastases, for example after surgical procedures or after chemotherapy.

The use comprises administering the pharmaceutical composition of the present invention to the subject. According to any one of the above embodiments, the composition of the present invention is administered as known in the art. According to one embodiment, the composition is parenterally administered, e.g. IP, IV, IM, SC or intratumorally. According to some embodiments, the composition is systemically administered. According to other embodiments, the composition is locally administered.

The terms "administering" or "administration of" a substance, a compound, the composition or an agent to a subject are used herein interchangeably and refer to an administration mode that can be carried out using one of a variety of methods known to those skilled in the art. For example, a compound or an agent can be administered, intravenously, arterially, intradermally, intramuscularly, intraperitonealy, intravenously, subcutaneously, ocularly, sublingually, orally (by ingestion), intranasally (by inhalation), intraspinally, intracerebrally, and transdermally (by absorption, e.g., through a skin duct). A compound or agent can also appropriately be introduced by rechargeable or biodegradable polymeric devices or other devices, e.g., patches and pumps, or formulations, which provide for the extended, slow or controlled release of the compound or agent. Administering can also be performed, for example, once, a plurality of times, and/or over one or more extended periods. According to some embodiments, the composition is administered 1, 2, 3, 4, 5 or 6 times a day. According to other embodiments, the composition is administered 1, 2, 3, 4, 5 or 6 times a month. In some embodiments, the administration includes both direct administration, including self-administration, and indirect administration, including the act of prescribing a drug. For example, as used herein, a physician who instructs a patient to self-administer a drug, or to have the drug administered by another and/or who provides a patient with a prescription for a drug is administering the drug to the patient. According to one embodiment, the pharmaceutical composition is parenterally administered. The term "parenteral" refers to subcutaneous, intracutaneous, intravenous, intramuscular, intraarticular, intraarterial, intrasynovial, intrasternal, intrathecal, intralesional, intraperitoneal and intracranial injection, as well as various infusion techniques.

According to some embodiments, the composition of the present invention is co-administered with an additional anti-cancer therapy therapy including but not limited to anticancer drugs, radiotherapy, immunotherapy and surgery. According to some embodiments, the pharmaceutical composition is co-administered with another anti-caner drug. According to some embodiments, the therapeutic agents suitable in an anti-neoplastic composition for treating cancer include, but not limited to, chemotherapeutic agents, radioactive isotopes, toxins, cytokines such as interferons, immunostimulating agents, immunomodulating agents and antagonistic agents targeting cytokines, cytokine receptors or antigens associated with tumor cells. In some embodiments, an anti-cancer agent is a chemotherapeutic.

According to another aspect, the present invention provides a method for treating cancer in a subject in need thereof comprising administering a therapeutically effective amount of the mAb antibodies, functional fragments thereof or the conjugate thereof of the present invention to the subject. According to another embodiment, the method comprises administering a pharmaceutical composition comprising the mAb, the fragments thereof or the conjugates, of the present invention to the subject. According to yet another embodiment, the method comprises administering a pharmaceutical composition comprising cells or expressing the mAb or the fragments thereof to the subject. According to some embodiments, the mAb antibodies or functional fragments thereof are formulated with a delivery system such as liposomes.

According to yet another aspect, the present invention provides a use of the mAb antibodies or functional fragments thereof of the present invention for preparing a medicament for treating cancer.

According to some aspects, the present invention provides a composition comprising a mAb, the fragment of the present invention that binds specifically to SLeA, or the conjugates thereof and a carrier. According to one embodiment, the composition comprises a plurality of the mAbs or the fragments of the present invention. According to another embodiment, the composition comprises a plurality of the conjugates of mAbs or the fragments of the present invention. According to some embodiments, the mAb or the fragment comprises a VH domain comprising amino acid sequence SEQ ID NO: 3 and a VL domain comprising amino acid sequence SEQ ID NO: 5, and a carrier. According to one embodiment, the composition comprises a nucleic acid or nucleic acid construct according to the present invention. According to some embodiment, the composition comprises a cell according to the present invention. According to one embodiment, the cell comprises a mAb or the fragment of the present invention that binds specifically to SLeA comprising VH domain comprising amino acid sequence SEQ ID NO: 3 and a VL domain comprising amino acid sequence SEQ ID NO: 5. The term "carrier" includes as a class any compound, solvent or composition useful in facilitating storage, stability, and use of the mAbs or fragments of the present invention.

In another aspect, the present invention provides a method of detecting, determining, and/or quantifying the expression SLeA on cells. According to some embodiments, detecting, determining, and/or quantifying the expression of SLeA may be used in diagnosing conditions associated with expression of SLeA, such as cancer. Thus, the mAb the fragment and the conjugate of the present invention is for use in cancer diagnosis, monitoring the progression of cancer, or monitoring and estimating the effectiveness of treatment of cancer. The term "monitoring cancer" encompasses the term monitoring the progression of cancer and monitoring the effectiveness of treatment of cancer. In some embodiments, the present invention provides a method of diagnosing, assessing the severity or staging of a proliferative disease such as cancer in a subject, the method comprises detecting the presence or expression of SLeA in a biological sample of the subject using at least one antibody or antibody fragment of the present invention or the composition comprising same. According to some embodiments, the antibody or fragment thereof is conjugated or labeled. According to some embodiments, the method comprises quantitatively comparing the level of expression of the SLeA glycan in a subject to a reference expression level of e.g. healthy subjects. According to some embodiments, change in expression of SLeA in comparison to healthy subjects indicates the presence of cancer. According to some embodiments, overexpression of the SLeA correlates with cancer. Thus, in some embodiments, detecting SLeA expression level above the reference value obtained from healthy subjects correlates with the presence of cancer. The term "biological sample" encompasses a variety of sample types obtained from an organism that may be used in a diagnostic or monitoring assay. The term encompasses blood and other liquid samples of biological origin, solid tissue samples, such as a biopsy specimen, or tissue cultures or cells derived therefrom and the progeny thereof. Additionally, the term may encompass circulating tumor or other cells. The term specifically encompasses a clinical sample, and further includes cells in cell culture, cell supernatants, cell lysates, serum, plasma, urine, amniotic fluid, biological fluids including aqueous humour and vitreous for eyes samples, and tissue samples. The term also encompasses samples that have been manipulated in any way after procurement, such as treatment with reagents, solubilisation, or enrichment for certain components.

According to any one of the above embodiments, the method comprises detecting SLeA in the sample, e.g. biological sample. The method comprises contacting the biological sample with the antibody or the fragment of the present invention. According to some embodiments, the antibody or the fragment are marked, tagged or labeled. According to other embodiments, secondary antibodies may be used to determine the level of binging of the antibody of the present invention or the fragment to the biological sample of its components. According to some embodiments, any known methods for determining and quantifying binding of an antibody or a fragment thereof to its target may be used. According to some embodiments, detecting comprises quantifying the amount of the SLeA. According to some embodiment, the method comprises a comparison of the content of the SLeA in a biological sample obtained from a subject to the control, i.e. comparing to the content of SLeA in the comparable biological sample of healthy subjects. According to some embodiments, the monitoring method comprises comparing SLeA content in a sample obtained from a subject at different times and assessing the propagation (i.e. monitoring) of the disease and/or effectiveness of treatment. According to some embodiments, the present invention provides a method of detection of SLeA in a tissue culture, in a tissue or in a section obtained from a subject.

The methods of determining or quantifying the expression of the SLeA according to any one of the above embodiments comprises comprising contacting a biological sample with an antibody or antibody fragment, and measuring the level of complex formation. Determining and quantifying methods may be performed in-vitro or ex-vivo. The antibodies according to the present invention may be also used to configure screening methods. For example, an enzyme-linked immunosorbent assay (ELISA), or a radioimmunoassay (RIA), as well as methods such as IHC or FACS, can be constructed for measuring levels of secreted or cell-associated SLeA glycan using the antibodies of the present invention and methods known in the art. According to some embodiments, the method for detecting or quantifying the presence of SLeA expressed on cells comprises the steps of:
(i) incubating a biological sample with antibodies, antibody fragments or conjugates of the present invention comprising at least an antigen-binding portion; and
(ii) detecting the bound SLeA using a detectable probe.
According to some embodiments, the method further comprises the steps of:
(iii) comparing the amount of (ii) to a standard curve obtained from a reference sample containing a known amount of SLeA; and
(iv) calculating the amount of the SLeA in the sample from the standard curve.

According to some particular embodiments, the sample is a body fluid.

According to some embodiments, the method is performed in-vitro or ex-vivo.

According to another aspect, the present invention provides a kit for detecting cancer, wherein the kit comprises an antibodies, antibody fragments or conjugates of the present invention and means for detecting the amount of the antibodies or antibody fragments bound to cells of the biological sample. According to some embodiments, the kit comprises instructions for use. According to some embodiments, the kit is a diagnostic kit.

The term "consisting essentially of" means that the composition or component may include additional ingredients, but only if the additional ingredients do not materially alter the basic and novel characteristics of the claimed compositions or methods.

Having now generally described the invention, the same will be more readily understood through reference to the following examples, which are provided by way of illustration and are not intended to be limiting of the present invention.

EXAMPLES

Methods

Antibodies

We used HRP-goat-anti-human IgG (H+L), Cy3-goat-anti-human IgG (H+L) (Jackson ImmunoResearch), Mouse anti c-myc (clone 9E10) (Santa cruz biotechnology), APC-Streptavidin (southernBiotech), Alexa Fluor 488 goat anti-mouse IgG1 (Life).

Random Mutagenesis and Library Generation

Sequences of 1116NS19.9 VH and VL (Native antibody) were obtained from IMGT database, accession number S65761 and S65921 respectively. Native scFv with $(G_4S)_3$ linker (DNA seq.: GGAGGTGGCGGTAGCG-GAGGCGGCGGTTCTGGAGGTGGCGGGAGC (SEQ ID NO: 20); Amino acids sequence: GGGGSGGGGSGGGGS (SEQ ID NO: 19) was synthesized by Integrated DNA Technologies Inc. (IDT) and pETCON2 plasmid was kindly provided by Prof. Sarel Fleishman. pETCON2 plasmid contains HA and cMyc tags to label the scFv: HA tag starts 30 amino acids upstream to VH: The c-myc tag starts 5 amino acids downstream to VL, and there is a GGGS linker in between the end of VL to the start of c-myc tag. pETCON2 plasmid was digested with NdeI and BamHI (Fermentas). Digested vector were extracted from gel using Wizard SV GEL & PCR clean-up system (Promega). EBY100 yeast cells were transformed with native scFv. To generate RA9 library, scFv was first amplified by mixing 2 μl scFv template, 1 μl of each primer, 25 μl 2× reddymix PCR master mix (Thermo Science) and 21 μl water. PCR settings were 95° C. for 2 minutes followed by 30 cycles of 95° C. for 30 seconds (s), 55° C. for 30 s, 72° C. for 60 s and final incubation of 72° C. for 5 minutes. Amplified fragment was purified and then subjected to mutagenesis by mixing 100 and 200 ng template, 1 μl of each primer, 1 μl dNTPs, 5 μl buffer, 1 μl polymerase of GeneMorph II Random mutagenesis Kit (Agilent) complete to 50 μl with water. Mutagenesis settings were 95° C. for 2 minutes followed by 17 cycles of 95° C. for 30 s, 60° C. for 30 s, 72° C. for 60 s and final incubation of 72° C. for 10 minutes. Each mutated fragment (100 and 200 ng original templates) was purified then amplified by preparing five identical reactions of 2 μl scFv template, 1 μl of each primer, 25 μl 2× reddymix PCR master mix (Thermo Science) and 21 μl water. PCR settings were 95° C. for 2 minutes followed by 30 cycles of 95° C.

for 30 s 55° C. for 30 s, 72° C. for 60 s and final incubation of 72° C. for 10 minutes. Amplified mutated fragments were purified from agarose gel. To generate RA9 library, yeast cells were prepared and electroporated according to Benatuil et al. 2010 (Protein Eng Des Sel. 2010; 23: 155-159).

Yeast FACS Staining and Sorting

RA9 yeast library was cultured in SD-Trp media at 30° C., passaged for three days, then scFv was expressed by changing the media to SG-Trp and the temperature to 20° C. For first panning $1\times10^8$ yeast cells were washed with 1 ml PBS+0.5% ovalbumin (sigma) (assay buffer) then incubated with 5 µM SLeA-PAA-Biotin and mouse anti-c-myc 1:50, both diluted in assay buffer for 1 hour in room temperature with rotation. Cell were washed with 1 ml ice cold assay buffer, then incubated for 40 minutes on ice with APC-Streptavidin and Alexa Fluor 488 goat anti-mouse IgG1 diluted 1:50 and 1:200 respectively in assay buffer. Cell were washed with 1 ml ice cold PBS, then top 5% of double positive yeast were sort into SD-Trp media using MoFlo Astrios EQ sorter (Beckman coulter). Recovered cells were induced again in second panning, $5\times10^7$ cells were stained with 1 µM SLeA-PAA-Biotin, other reagents were at same concentration as in first panning. Top 1% of double positive yeast were collected. In third panning cycle, $1\times10^7$ cells were stained with 0.1 µM SLeA-PAA-Biotin, other reagents were at same concentration as in first panning. Top 0.5% of double positive yeast were collected. Sorted cells were plated on SD-Trp plates and 30 single colonies were picked and cultured.

Apparent $K_D$ Calculations with Yeast

Native and RA9 clones scFv expressing yeast cells were stained to FACS analysis as before. The antigens were added in serial dilutions ranging from 10-0.00016 µM in PBS+0.5% ovalbumin. We gated the scFv expressing cells and calculate the geometric mean of antigen binding. Geometric mean was plotted vs antigen concentration and apparent $K_D$ was calculated according to non-linear fit with one-site specific binding using GraphPad Prism 8.0.

Gibson Assembly

Plasmids of selected clones were purified using Zymoprep Yeast Plasmid Miniprep II (Zymo Research) according to manufacturer instructions. Variable heavy and light fragments of native and selected clones were amplified by PCR. Reaction was made in Q5 reaction buffer, with 1 µl of plasmid DNA template (65-98 ng), 200 µM each dNTP, 1 U Q5 hot start high fidelity DNA polymerase, 500 nM each primer complete volume to 50 µl with water. Reaction conditions were 95° C. for 2 minutes followed by 30 cycles of 95° C. for 30 s, 61° C. for 60 s, 72° C. for 60 s and final incubation of 72° C. for 5 minutes. To the amplified mix 6 µl of 10× cutsmart buffer, 20 U DpnI (New England Biolabs), complete volume to 60 µl with water, and incubate in 37° C. for 1 hour. Fragments were purified from agarose gel Zymoclean Gel DNA Recovery Kit (Zymo Research). p3BNC plasmids were divided to three parts, variable region, left and right arms. Left and right arms of heavy and light p3BNC plasmids were amplified and purified. Of each fragment, variable region, right and left arms, 25 ng were taken for Gibson assembly. Reaction was made in isothermal reaction buffer containing 5% PEG 8000, 100 mM Tris-HCl pH 7.5, 10 mM MgCl2, 10 mM DTT, 0.2 mM of each dNTP and 10 mM NAD. To this buffer we added 0.04 U T5 exonuclease (NEB), 0.25 U Phusion polymerase (NEB) and 40 U Taq DNA ligase (NEB), ligation was made in 50° C. for 1 hour. Plasmids were electroporated into XL1 E. coli, to validate the sequence and producing high amount of expression plasmids.

Antibody Purification

Human embryonic kidney 293A cells were used to produce whole Native and RA9-clones antibodies using polyethylenimine (PEI; Polysciences) reagent as described before. Antibodies were purified using protein A (GE healthcare) and concentrations were determined by BCA assays (Pierce). For higher antibody amounts, p3BNC plasmids with variable region of Ab RA9 upstream to human IgG1 heavy and light constant regions were transfected into HEK293F cells using PEI max as a transfection reagent (Polysciences). Medium sup was collected six days post transfection, centrifuged and filtered with the addition of PMSF and azide. Medium was loaded on a protein-A column (GE lifesciences), eluted with 0.1M citric acid pH3 and brought to pH7 with 2M tris buffer pH8.

Antibodies $K_D$

Polyvalent binding studies were carried out using the Octet Red system (ForteBio, Version 8.1, Menlo Park, CA, USA, 2015) that measures biolayer interferometry (BLI). All steps were performed at 30° C. with shaking at 1500 rpm in a black 96-well plate containing 200 µL solution in each well. Streptavidin-coated biosensors were loaded with 50 nM of biotinylated SLeA-PAA (or biotinylated Lea-PAA, as a negative control) for 300 s followed by washing step [with PBS buffer, pH 7.4, containing 1 mg/ml BSA and 0.1% (v/v) Tween 20]. Sensors were then reacted for 300 s with each antibody (native and selected clones) at increasing concentrations from 25 to 100 nM and then moved to buffer-containing wells for another 300 s (dissociation phase). Binding and dissociation were measured as changes over time in light interference after subtraction of parallel measurements from unloaded biosensors. Sensorgrams were fitted with a 1:1 binding model using the Octet data analysis software 8.1 (Fortebio, Menlo Park, CA, USA, 2015).

ELISA

Binding of antibodies to various glycans was tested by ELISA. Glycans (Glycotech) were coated in duplicates at 0.25 µg/well in 50 mM sodium carbonate-bicarbonate buffer, pH 9.5 onto 96-well microtiter plates (Costar, Corning) and plates were incubated overnight at 4° C. Wells were blocked for 1 hour at room temperature with blocking buffer [PBS pH 7.4, 1% ovalbumin (Grade V, Sigma)]. Blocking buffer was removed and primary antibody was added at 10 µg/ml in 100 µl/well in the same blocking buffer for two hours at room temperature. The plates were washed three times with PBST (PBS pH 7.4, 0.1% Tween) and subsequently incubated for 1 hour at room temperature with HRP-goat anti-human IgG 0.11 µg/ml in PBS. After washing three times with PBST, wells were developed with 140 µl of 0-phenylenediamine in 100 mM citrate-$PO_4$ buffer, pH 5.5, and the reaction stopped with 40 µl of $H_2SO_4$ (4 M). Absorbance was measured at 490 nm on SpectraMax M3 (Molecular Devices). Specific binding was defined by subtracting the background readings obtained with the secondary antibody only on wells coated with PAA. For ELISA inhibition assay, 96 well plate was coated with SLeA-PAA-Biotin (GlycoTech) in triplicates at 0.25 µg/well overnight at 4° C. Wells were blocked with blocking buffer. The RA9-23 antibody at 0.16 µg/mL was pre-incubated with either specific or non-specific target antigens (SLeA-PAA-Biotin and LeA-PAA-Biotin or SLeX-PAA-Biotin glycans, respectively) at 300-0.3 nM in blocking buffer. Antibody-glycan mixtures were incubated at 4° C. for two hours. Blocking buffer was removed from plate and antibody-glycan mixtures were added to the respective wells at 100 µL/well in triplicates, then incubated for two hours at room temperature, followed by washing, secondary antibody and substrate developing, as described above.

Cell Culture

WiDr and Capan2 cells (human colorectal and pancreatic cancer cell lines, respectively) were obtained from American Type Culture collection (ATCC). WiDr and Capan2 cells were grown in DMEM (biological industries) supplemented with 10% heat inactivated fetal bovine serum (FBS), 2 mM L-glutamine, 100 units/ml penicillin and 0.1 mg/ml streptomycin.

Cancer Cells Binding Assays

WiDr and Capan2 cells (human colorectal and pancreatic cancer cell lines, respectively) were collected from plates using 10 mM EDTA. Cells were incubated with native and RA9-23 antibodies diluted in PBS+0.5% fish gelatin for 1 hour on ice, followed by incubation with Cy3 AffiniPure Goat Anti-Human IgG (H+L) (Jackson) diluted 1:100 in PBS+0.5% fish gelatin for 1 hour on ice. Fluorescence of cells were measured by CytoFLEX flow cytometry (Beckman Coulter).

For sialidase FACS assay, WiDr cells were collected from plates using 10 mM EDTA. $0.5\text{-}10^6$ cells were divided into Eppendorf tubes and incubated for four hours at 37° C. with either PBS, 50 mU active *Arthrobacter* Ulreafaciens Sialidase (AUS) (EY Laboratories, San Mateo, CA, USA) or 50 mU inactive AUS (pre-incubated in 90° C. for 30 min) in PBS. Then, cells were washed with FACS buffer, stained with 2.5 µg/mL RA9-23 antibody, followed by washing, secondary antibody labeling and fluorescence measurement, as described above.

CDC Assay

For complement-dependent cytotoxicity (CDC) we used rabbit complement (Sigma). Cytotoxicity was evaluated by measuring lactate dehydrogenase (LDH) release using LDH Cytotoxicity Detection kit (Roche Applied Science) according to the manufacturer's instructions. All assays included maximum release control contains rabbit complement diluted 1:6 with 1% TritonX-100. For spontaneous release control, cells were incubated only with rabbit complement. Percentage cytotoxicity was calculated as: (test release−spontaneous release)/(maximum release−spontaneous release)×100. $2\times10^4$ target Cells were incubated in triplicates with antibodies at 20 and 2 ng/µl for 1 hour on ice in 96-well round-bottom plates. Rabbit complement and triton were added and plates were incubated for 2 hours at 37° C. Then supernatants were collected and LDH release was determined.

Sialoglycan Microarray Fabrication

Arrays were fabricated with NanoPrint LM-60 Microarray Printer (Arrayit) on epoxide-derivatized slides (Corning 40044) with 16 sub-array blocks on each slide. Glycoconjugates were distributed into one 384-well source plates using 4 replicate wells per sample and 8 µl per well (Version 2.0). Each glycoconjugate was prepared at 100 µM in an optimized print buffer (300 mM phosphate buffer, pH 8.4). To monitor printing quality, replicate-wells of human IgG (80, 40, 20, 10, 5, 0.25 ng/µl in PBS+10% glycerol) and AlexaFlour-555-Hydraside (Invitrogen A20501MP, at 1 ng/µl in 178 mM phosphate buffer, pH 5.5) were used for each printing run. The arrays were printed with four 946MP3 pins (5 µm tip, 0.25 µl sample channel, ~100 µm spot diameter; Arrayit). Each block (sub-array) has 20 spots/row, 20 columns with spot to spot spacing of 275 µm. The humidity level in the arraying chamber was maintained at about 70% during printing. Printed slides were left on arrayer deck over-night, allowing humidity to drop to ambient levels (40-45%). Next, slides were packed, vacuum-sealed and stored at room temperature (RT) until used.

Sialoglycan Microarray Binding Assay

Slides were developed and analyzed as previously described by Padler-Karavani (J Biol Chem. 2012; 287: 22593-22608) with some modifications. Slides were rehydrated with dH$_2$O and incubated for 30 min in a staining dish with 50° C. pre-warmed ethanolamine (0.05 M) in Tris-HCl (0.1 M, pH 9.0) to block the remaining reactive epoxy groups on the slide surface, then washed with 50° C. pre-warmed dH$_2$O. Slides were centrifuged at 200×g for 5 min then fitted with ProPlate™ Multi-Array 16-well slide module (Invitrogen) to divide into the sub-arrays (blocks). Slides were washed with PBST (0.1% Tween 20), aspirated and blocked with 200 µl/sub-array of blocking buffer (PBS/OVA, 1% w/v ovalbumin, in PBS, pH 7.3) for 1 hour at RT with gentle shaking. Next, the blocking solution was aspirated and 100 µl/block of purified antibodies in 20-1.28× $10^{-4}$ ng/µl diluted in PBS/OVA were incubated with gentle shaking for 2 hours at RT. Slides were washed three times with PBST, then with PBS for 2 min. Bound antibodies were detected by incubating with secondary detection diluted in PBS, 200 µl/block at RT for 1 hour, Cy3-anti Human IgG 0.4 µg/ml (Jackson Immunoresearch). Slides were washed three times with PBST then with PBS for 10 min followed by removal from ProPlate™ Multi-Array slide module and immediately dipping in a staining dish with dH$_2$O for 10 min with shaking, then centrifuged at 200×g for 5 min. Dry slides immediately scanned.

Array Slide Processing and Apparent K$_D$ Calculations

Processed slides were scanned and analyzed as described at 10 µm resolution with a Genepix 4000B microarray scanner (Molecular Devices) using 350 gain. Image analysis was carried out with Genepix Pro 6.0 analysis software (Molecular Devices). Spots were defined as circular features with a variable radius as determined by the Genepix scanning software. Local background subtraction was performed. Apparent K$_D$ was calculated according to non-linear fit with one-site specific binding using GraphPad Prism 8.0.

Homology Modeling

A 3D structure of the of the Fv domain (VH and VL) for both the native and RA9-23 sequences was generated using the PIGS webtool. Structure templates with approximately 90° % were found for both the VH (PDB ID=1DLF) and VL chains (PDB ID=3LIZ).

Molecular Dynamics Simulations of Homology Models

All simulations were performed using the Amber16 software suite. Using tleap, the 3D structures were placed in a cubic box of TIP5P water with a 10 Å water buffer with counterions to neutralize the system. The FF14SB force field with cut-offs of 10.0 Å for Van Der Waals interactions and 8.0 Å for electrostatics were employed. Initial energy minimization (10,000 steps steepest decent followed by 10,000 steps conjugate gradient) was performed with Cartesian restraints (5 kcal/mol throughout all phases) on all solute heavy atoms to optimize the water molecules position and orientation. The same restraints were employed during a 400 ps nPT equilibration phase at 300° K. This was followed by a 1 ns structural equilibration phase with Cartesian restraints on protein Cα. The atom positions and velocities from the last step of equilibration were used to start a 500 ns production run, were no restraints were employed.

Following an initial analysis, a further set of MD simulations were performed using five structures taken at regular intervals from the last 100 ns of the 500 ns production run using cpptraj program. Analyses of the trajectories were performed using cpptraj. Plots were generated using gnuplot. Figures with 3D structures were created using UCSF Chimera or VMD.

Statistical Analysis

Statistical analysis conducted with Prism 8 with the specific methods as indicated in the figure legends.

Example 1. Yeast Surface Display (YSD) for In-Vitro Affinity Maturation of Anti-SLeA Antibody We used the YSD system to generate potent anti-SLeA antibodies of high affinity and specificity. We cloned the VH and VL sequence fragments of 1116NS19.9 antibody into the YSD system vector pETCON2 in a scFv expression format, under the Gal promoter. S. cerevisiae EBY100 cells were then transformed with the plasmid to obtain cell surface expression of the cloned scFv. Expression and antigen binding of scFv was then evaluated by flow cytometry using biotinylated polyacrylamide conjugated carbohydrate antigens and mouse anti c-Myc.

The scFv of a native 1116NS19.9 antibody against SLeA antigen with $(G_4S)_3$ linker was synthesized by IDT. Competent yeast cells were transformed with scFv and NdeI BamHI digested pETCON2 to generate native scFv expressing yeast cells. Transformed yeast cells showed expression of the scFv and binding of SLeA antigen.

For in-vitro affinity maturation, random mutagenesis was applied on the scFv fragment followed cloning into the YSD system to generate the YSD library. Next, by three cycles of panning and selection using FACS sorter potent clones were selected. In each cycle the stringency was increased by lowering antigen concentration and collection of a lower percentage of double-positive cells (for scFv expression and antigen binding). Antigen binding of the library had increased after each cycle. Single colonies from plated yeast libraries were picked after the third sorting cycle and antigen binding was compared to the native antibody. Five of the examined colonies had unique sequences and showed increased binding compared to the native antibody (FIG. 1).

Example 2. Affinity Assessment of Selected Antibody Clones

Figure 2:
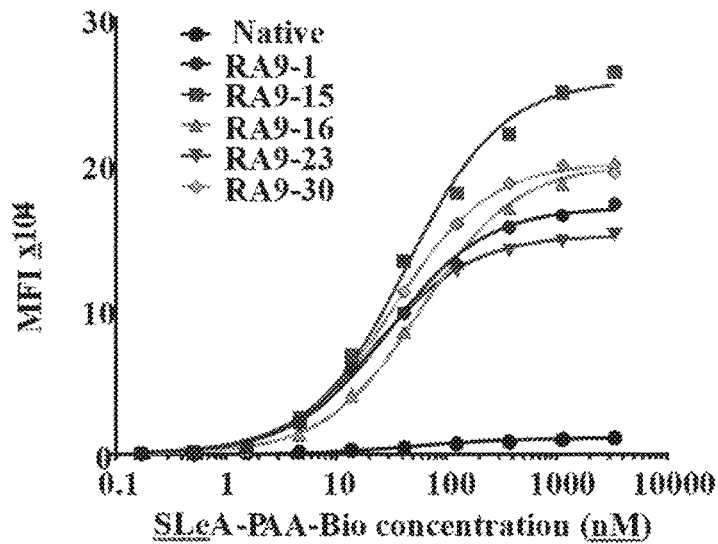
FIG. 2 shows the binding capacity of selected RA9-clones-expressing yeast cells. Clones were examined against 10 serial dilutions of SLeA-PAA-biotin (3333-0.16 nM) by FACS and the apparent $K_D$ was then calculated by Prism.
Figure 3A:
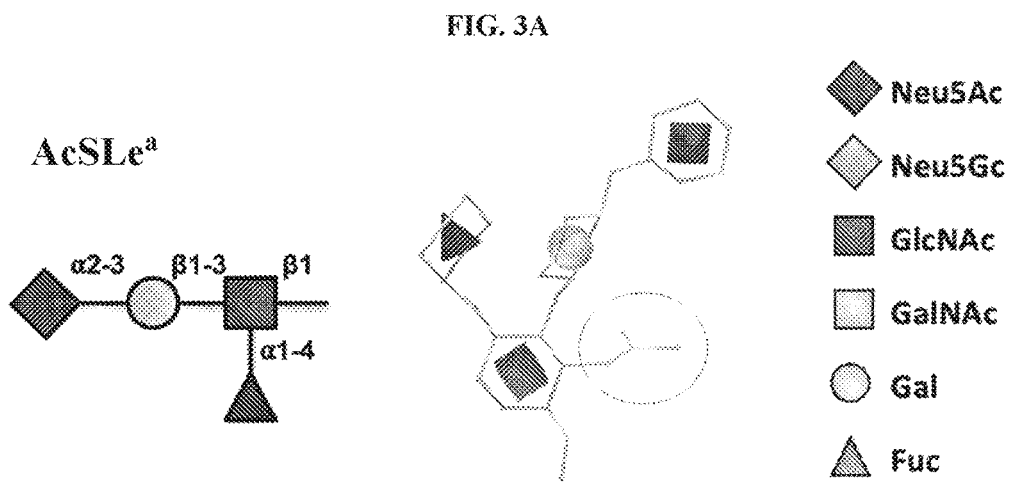
Figure 3B:
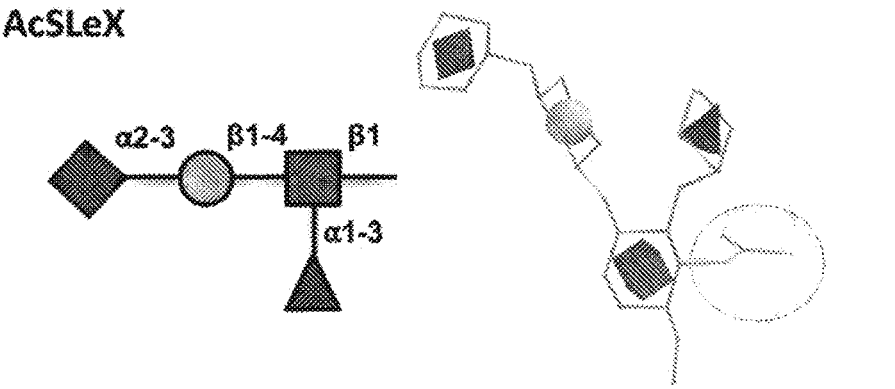
(FIG. 3B—SLeX.
Figure 3C:
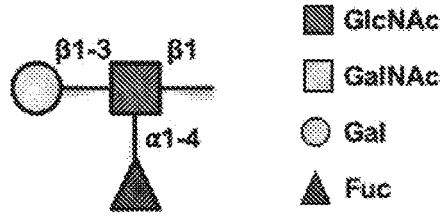
FIG. 3C—LeA.
Figure 3D:
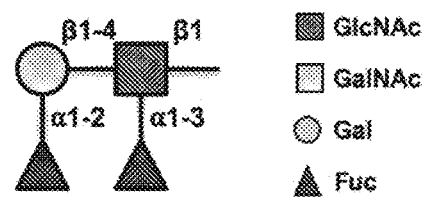
FIG. 3D—LeY.
Figure 3E:
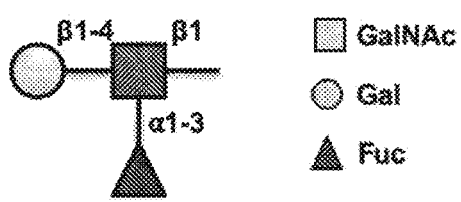
FIG. 3E—LeX.
Figure 3F:
FIG. 3F—Ac-alpha-2-3GalNAc.
Figure 3G:
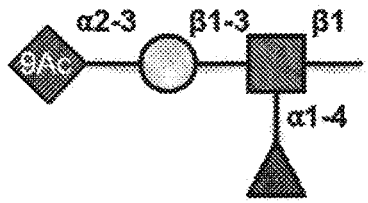
Figure 3H:
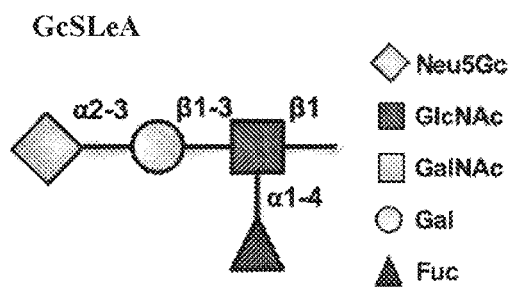
FIG. 3H—GcSLeA and FIG. 3I—9-O-GcSLeA.
Figure 3I:
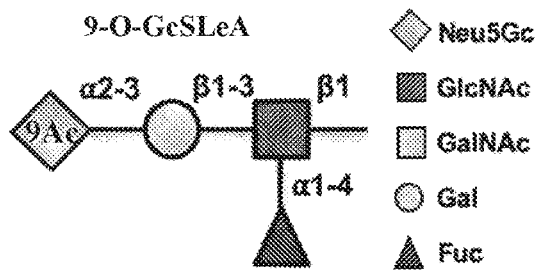

Antigen titration allows to evaluate the affinity of selected yeast clones of Example 1 compared to native antibody. All yeast clones showed increased antigen binding by FACS, and apparent $K_D$ (affinity) and Bmax (the maximal binding for each antibody) were calculated from saturation curves (FIG. 2), according to non-linear fit with one-site specific binding using GraphPad Prism 8.0 and presented in Table 3.

TABLE 3

$K_D$ values of 5 selected yeast clones.

| Clone | $K_D$ (nM) | SD | Bmax (MFI) | SD |
|---|---|---|---|---|
| Native (1116NS19.9) | 52 | 10 | 10951 | 486 |
| RA9-1 | 30 | 1.9 | 169694 | 2143 |
| RA9-15 | 43 | 3.8 | 256777 | 4772 |
| RA9-16 | 59 | 3 | 199174 | 2207 |
| RA9-23 | 22 | 0.8 | 150665 | 1041 |
| RA9-30 | 33 | 1.4 | 200983 | 1781 |

In addition, full-length IgG antibodies were produced from the scFvs by cloning the VH and VL domains into p3BNC human IgG1 expression vectors. Full-length antibodies were produced in 293A cells and purified with protein A. $K_D$ of whole antibodies was also determined by antibody binding kinetics (surface plasmon resonance with Biacore), using polyvalent biotinylated SLeA-PAA as antigen. All selected clones showed higher affinity than the native antibody (1116NS19.9), with affinities in the nM range (Table 4).

TABLE 4

$K_D$ of whole antibodies of the selected clones.

| Antibody | $K_{on}$ ($M^{-1}s^{-1}$) | $K_{off}$ (1/s) | $K_D$ (nM) | $K_D$ Native/ $K_D$ RA9-# |
|---|---|---|---|---|
| Native | $5.4 \times 10^4$ | $2.3 \times 10^{-3}$ | 42 | 1 |
| RA9-1 | $7 \times 10^4$ | $6.3 \times 10^{-4}$ | 9 | 4.7 |
| RA9-15 | $1.2 \times 10^4$ | $2.1 \times 10^{-3}$ | 18 | 2.3 |
| RA9-16 | $1.1 \times 10^4$ | $1.2 \times 10^{-3}$ | 11 | 3.8 |
| RA9-23 | $1 \times 10^4$ | $1.2 \times 10^{-3}$ | 12 | 3.5 |
| RA9-30 | $7.4 \times 10^4$ | $2.7 \times 10^{-3}$ | 37 | 1.1 |

Example 3. Full-Length Antibodies Specificity

Figure 4:
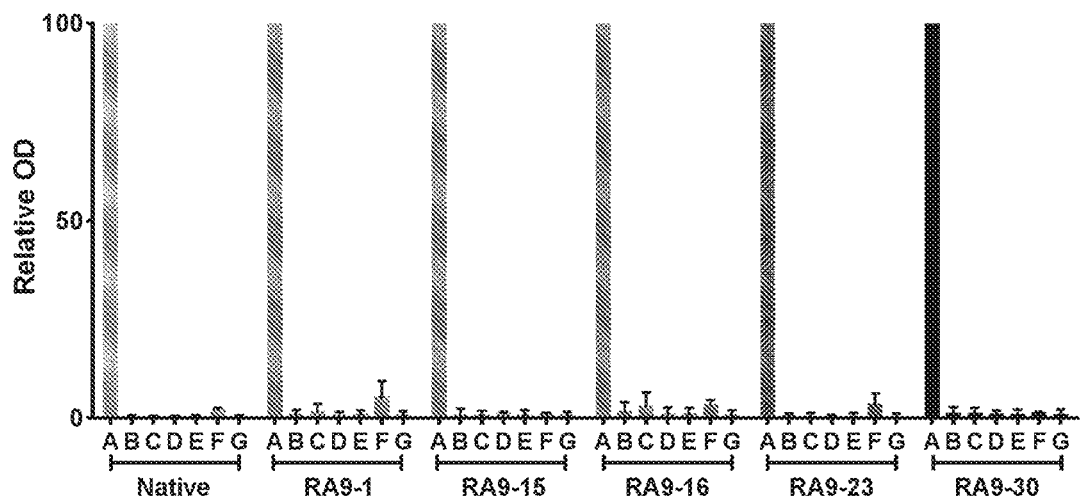

The process of in-vitro affinity maturation process can potentially cause undesired changes to specificity of antibodies. ELISA assay against five different nanoparticles of SLeA-closely-related PAA-glycans [SLeA, SLeX, LeA, LeY, LeX, and a shorter sialic acid-containing glycan (Neu5Acα2-3GalNAc (c)(see FIG. 3)] showed that all cloned antibodies specifically bind the SLeA glyco-nanoparticle antigen maintaining recognition pattern of the native clone, despite the mutagenesis during YSD library design (FIG. 4). These results show that all generated antibodies detect SLeA as the top target.

The selected antibodies also showed specific recognition patterns similar to the native antibody, as shown by glycan microarrays (FIG. 4). This analysis also revealed that sialic acid is imperative for antigen binding, since the binding to the Lea antigen that lacks the sialic acid was very low (less than 3.3%) in all antibodies. Additionally, even though SLeA and SLeX contains the same four building blocks, they are perceived as completely different structure, and there is very low cross reactivity (less than 1.8%) in all antibody clones). Without being bound to a particular theory, this could be explained by the differential spatial organization of these isomers. In SLeA the GlcNAc N-acetyl group and the sialic acid face the same side, but oppositely oriented in SLeX (FIG. 3), generating a completely different 3D structure that could not be recognized by the antibody. This is a striking example of how glycan-linkages are import and critical in glycan diversity and complexity in nature. Altogether, these results demonstrate that selected anti-SLeA antibodies are highly specific and of high affinity. Particularly, RA9-23 antibodies showed the highest affinity when displayed on yeast, and the second highest affinity as a full length antibody, as demonstrated by Biacore. Together with high specificity RA9-23 antibodies seemed to be the most promising clone, hence it was further investigated. The sequence of the heavy and light variable chains of RA9-23 are shown below.

Heavy Chain:

KVKLEESGGG LVQPGGSMKL SCAASGFTFS DAWMDWVRQS

PEKGLEWVAE IGNKGNNHAT NYAESVKGRF TVSRDDSKSR

VYLQMNSLRV EDTGTYYCTT RFAYWGQGTP VTVPA

Light Chain:

```
DIKMTQSPSS MYASLGERVT IPCKASQDIN SYLSWFQQKP
GKSPKTLIYR ANRLVDGVPS RFSGSGSGQD YSLTISSLEY
EDMGIYYCLQ YDEFPRTFGG GTKLEIK
```

It is well known that CDRs may be defined in different methods. According to Kabat the CDR1, 2, and 3 of the heavy chain have amino acid sequences: DAWMD; EIGNKGNNHATNYAESVKG and RFAY, respectively, and the CDRs 1, 2, and 3 of the light chain have amino acid sequences KASQDINSYLS; RANRLVD; and LQYDEFPRTF, respectively.

Figure 6:
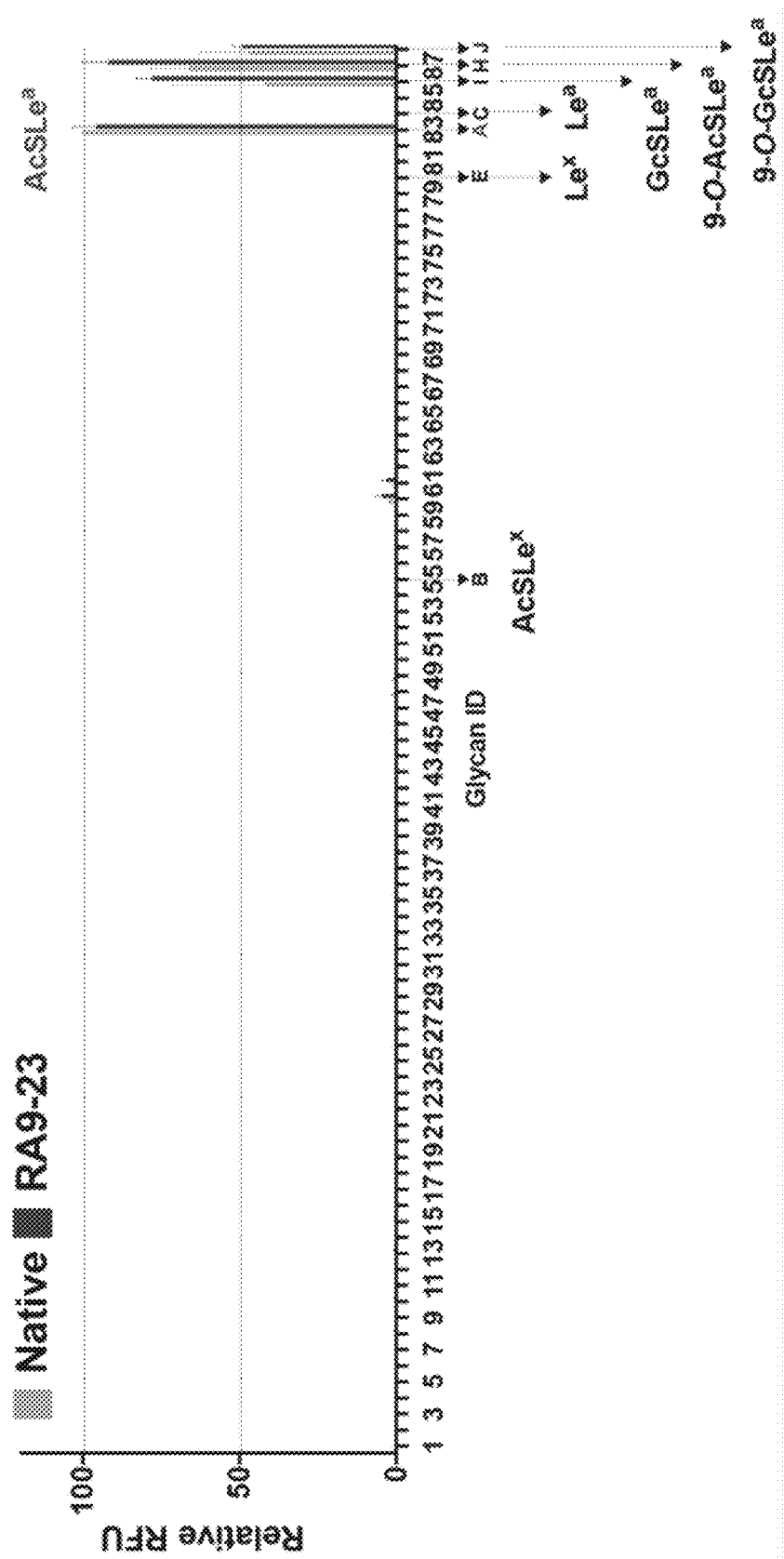

For more detailed specificity analysis we used nano-printed glycan microarrays to determine the specificity in a high-throughput assay which contains 88 different glycans (Table 5). The array analysis showed that both antibodies are very specific to AcSLeA (glycan #83), GcSLeA (glycan #86) and their corresponding 9-O-acetylated versions (glycan #87 and #88, respectively) (FIG. 6). Most importantly, the mutagenesis did not impair specificity, as the recognition pattern of the generated antibodies remained similar to that of the native antibody. The importance of the sialic acid and fucose residues for the antibody recognition is also demonstrated, as Lea (glycan #84) and Neu5Ac-α-2-3-Galp1-3GlcNAcp-ProNH2 (non-fucosylated SLeA, glycan #13) were not detected at all.

Figure 5:
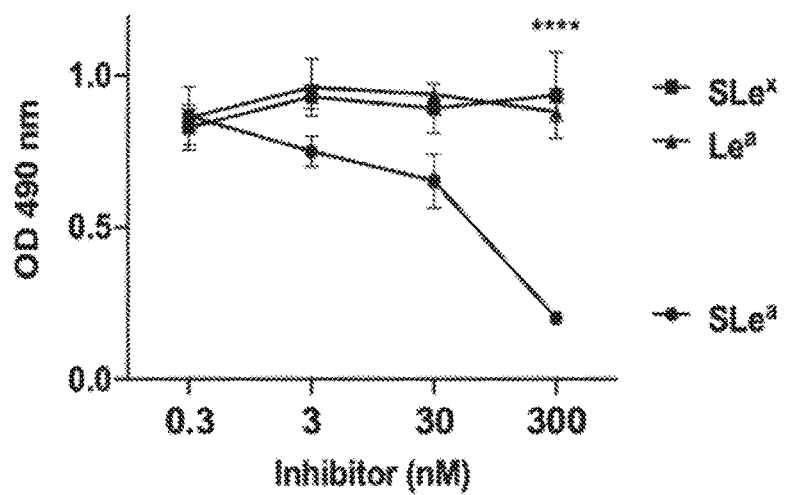

The specificity of this mutant clone was further demonstrated by ELISA inhibition assay, in which binding of RA9-23 to SLeA was inhibited only with the specific glycan SLeA, but not with the closely-related glycans SLeX or LeA (FIG. 5).

TABLE 5

List of glycans fabricated on glycan microarrays.

| Glycan ID | Structure |
|---|---|
| 1 | Neu5,9Ac$_2$α3Galβ4GlcNAcβO(CH$_2$)$_2$CH$_2$NH$_2$ |
| 2 | Neu5Gc9Acα3Galβ4GlcNAcβO(CH$_2$)$_2$CH$_2$NH$_2$ |
| 3 | Neu5,9Ac$_2$α6Galβ4GlcNAcβO(CH$_2$)$_2$CH$_2$NH$_2$ |
| 4 | Neu5Gc9Acα6Galβ4GlcNAcβO(CH$_2$)$_2$CH$_2$NH$_2$ |
| 5 | Neu5Acα6GalNAcαO(CH2)$_2$CH$_2$NH$_2$ |
| 6 | Neu5Gcα6GalNAcαO(CH$_2$)$_2$CH$_2$NH$_2$ |
| 7 | Neu5,9Ac$_2$α3Galβ3GlcNAcβO(CH$_2$)$_2$CH$_2$NH$_2$ |
| 8 | Neu5Gc9Acα3Galβ3GlcNAcβO(CH$_2$)$_2$CH$_2$NH$_2$ |
| 9 | Neu5,9Ac$_2$α3Galβ3GalNAcαO(CH$_2$)$_2$CH$_2$NH$_2$ |
| 10 | Neu5Gc9Acα3Galβ3GalNAcαO(CH$_2$)$_2$CH$_2$NH$_2$ |
| 11 | Neu5Acα3Galβ4GlcNAcβO(CH$_2$)$_2$CH$_2$NH$_2$ |
| 12 | Neu5Gcα3Galβ4GlcNAcβO(CH$_2$)$_2$CH,NH$_2$ |
| 13 | Neu5Acα3Galβ3GlcNAcβO(CH$_2$)$_2$CH$_2$NH$_2$ |
| 14 | Neu5Gcα3Galβ3GlcNAcβO(CH$_2$)$_2$CH$_2$NH$_2$ |
| 15 | Neu5Acα3Galβ3GalNAcαO(CH$_2$)$_2$CH$_2$NH$_2$ |
| 16 | Neu5Gcα3Galβ3GalNAcαO(CH$_2$)$_2$CH$_2$NH$_2$ |
| 17 | Neu5Acα6Galβ4GlcNAcβO(CH$_2$)$_2$CH$_2$NH$_2$ |
| 18 | Neu5Gcα6Galβ4GlcNAcβO(CH$_2$)$_2$CH$_2$NH$_2$ |
| 19 | Neu5Acα6Galβ4GlcβO(CH$_2$)$_2$CH$_2$NH$_2$ |
| 20 | Neu5Gcα6Galβ4GlcβO(CH$_2$)$_2$CH$_2$NH$_2$ |
| 21 | Neu5Acα3Galβ4GlcβO(CH$_2$)$_2$CH$_2$NH$_2$ |
| 22 | Neu5Gcα3Galβ4GlcβO(CH$_2$)$_2$CH$_2$NH$_2$ |
| 23 | Neu5,9Ac$_2$α6GalNAcαO(CH$_2$)$_2$CH$_2$NH$_2$ |
| 24 | Neu5Gc9Acα6GalNAcαO(CH$_2$)$_2$CH$_2$NH$_2$ |
| 25 | Neu5Acα3GalβO(CH$_2$)$_2$CH$_2$NH$_2$ |
| 26 | Neu5Gcα3GalβO(CH$_2$)$_2$CH$_2$NH$_2$ |
| 27 | Neu5Acα6GalβO(CH$_2$)$_2$CH$_2$NH$_2$ |
| 28 | Neu5Gcα6GalβO(CH$_2$)$_2$CH$_2$NH$_2$ |
| 29 | Neu5,9Ac$_2$α3GalβO(CH$_2$)$_2$CH$_2$NH$_2$ |
| 30 | Neu5Gc9Acα3GalβO(CH$_2$)$_2$CH$_2$NH$_2$ |
| 31 | Neu5,9Ac$_2$α6GalβO(CH$_2$)$_2$CH$_2$NH$_2$ |
| 32 | Neu5Gc9Acα6GalβO(CH$_2$)$_2$CH$_2$NH$_2$ |
| 33 | Neu5Acα3Galβ3GalNAcβO(CH$_2$)$_2$CH$_2$NH$_2$ |
| 34 | Neu5Gcα3Galβ3GalNAcβO(CH$_2$)$_2$CH$_2$NH$_2$ |
| 35 | Neu5,9Ac$_2$α3Galβ3GalNAcβO(CH$_2$)$_2$CH$_2$NH$_2$ |
| 36 | Neu5Gc9Acα3Galβ3GalNAcβO(CH$_2$)$_2$CH$_2$NH$_2$ |
| 37 | Neu5,9Ac$_2$α6Galβ4GlcβO(CH$_2$)$_2$CH,NH$_2$ |
| 38 | Neu5Gc9Acα6Galβ4GlcβO(CH$_2$)$_2$CH$_2$NH$_2$ |
| 39 | Neu5,9Ac$_2$α3Galβ4GlcβO(CH$_2$)$_2$CH,NH$_2$ |
| 40 | Neu5Gc9Ac3Galβ4GlcβO(CH$_2$)$_2$CH$_2$NH$_2$ |
| 41 | Neu5Acα8Neu5Acα3Galβ4GlcβO(CH$_2$)$_2$CH$_2$NH$_2$ |
| 42 | Neu5Acα8Neu5Acα8Neu5Acα3Galβ4GlcβO(CH$_2$)$_2$CH$_2$NH$_2$ |
| 43 | Galβ4GlcβO(CH$_2$)$_2$CH$_2$NH$_2$ |
| 44 | Galβ4GlcBNH$_2$ |
| 45 | Galβ4GlcNAcβO(CH$_2$)$_2$CH$_2$NH$_2$ |
| 46 | GalβNH$_2$ |
| 47 | GalNAcαO(CH$_2$)$_2$CH$_2$NH$_2$ |
| 48 | GalβO(CH$_2$CH$_2$)$_6$NH$_2$ |
| 49 | GalβO(CH$_2$)$_2$CH$_2$NH$_2$ |
| 50 | Galβ4GlcβO(CH$_2$CH$_2$)$_6$NH$_2$ |
| 51 | Galβ3GalNAcβO(CH$_2$)$_2$CH$_2$NH$_2$ |
| 52 | Galβ3GalNAcαO(CH$_2$)$_2$CH$_2$NH$_2$ |
| 53 | Galβ3GlcNAcβO(CH$_2$)$_2$CH$_2$NH$_2$ |
| 54 | Galβ4GlcNAcoSβO(CH$_2$)$_2$CH$_2$NH$_2$ |
| 55 | Neu5Acα3Galβ4(Fucα3)GlcNAcβO(CH$_2$)$_2$CH$_2$NH$_2$ |
| 56 | Neu5Gcα3Galβ4(Fucα3)GlcNAcβO(CH$_2$)$_2$CH$_2$NH$_2$ |
| 57 | Neu5Acα3Galβ4(Fucα3)GlcNAc6SβO(CH$_2$)$_2$CH$_2$NH$_2$ |
| 58 | Neu5Gcα3Galβ4(Fucα3)GlcNAc6SβO(CH$_2$)$_2$CH$_2$NH$_2$ |
| 59 | Galβ3GlcNAcB3Galβ4GlcβO(CH$_2$)$_2$CH$_2$NH$_2$ |
| 60 | Neu5Acα3Galβ3GlcNAcB3Galβ4GlcβO(CH$_2$)$_2$CH$_2$NH$_2$ |
| 61 | Neu5Gcα3Galβ3GlcNAcp3Galβ4GlcβO(CH$_2$)$_2$CH$_2$NH$_2$ |
| 62 | Neu5Acα3Galβ4GlcNAc6SβO(CH$_2$)$_2$CH$_2$NH$_2$ |
| 63 | Neu5Gcα3Galβ4GlcNAc6SβO(CH$_2$)$_2$CH$_2$NH$_2$ |
| 64 | Neu5Acα8Neu5Acα3Galβ4GlcβO(CH$_2$)$_3$NHCOCH$_2$(OCH$_2$CH$_2$)NH$_2$ |
| 65 | Neu5Acα8Neu5Acα8Neu5Acα3Galβ4GlcβO(CH$_2$)$_3$NHCOCH$_2$(OCH$_2$CH$_2$)$_6$NH$_2$ |
| 66 | Neu5Acα6(Neu5Acα3)Galβ4GlcβO(CH$_2$)$_2$CH$_2$NH$_2$ |
| 67 | Neu5Acα6(Neu5Gcα3)Galβ4GlcβO(CH$_2$)$_2$CH$_2$NH$_2$ |
| 68 | Neu5Acα6(Kdnα3)Galβ4GlcβO(CH$_2$)$_2$CH$_2$NH$_2$ |
| 69 | Neu5Gcα8Neu5Acα3Galβ4GlcβO(CH$_2$)$_2$CH$_2$NH$_2$ |
| 70 | Kdnα8Neu5Acα3Galβ4GlcβO(CH$_2$)$_2$CH$_2$NH$_2$ |
| 71 | Neu5Acα8Kdnα6Galβ4GlcβO(CH$_2$)$_2$CH$_2$NH$_2$ |
| 72 | Neu5Acα8Neu5Gcα3Galβ4GlcβO(CH$_2$)$_2$CH$_2$NH$_2$ |
| 73 | Neu5Acα8Neu5Gcα6Galβ4GlcβO(CH$_2$)$_2$CH$_2$NH$_2$ |
| 74 | KDNα8Neu5Gcα3Galβ4GlcβO(CH$_2$)$_2$CH$_2$NH$_2$ |
| 75 | Neu5Gcα8Neu5Gc-α3Galβ4GlcβO(CH$_2$)$_2$CH$_2$NH$_2$ |
| 76 | Neu5Acα8NeuSAcα6Galβ4GlcβO(CH$_2$)$_2$CH$_2$NH$_2$ |
| 77 | Neu5GcMeα8Neu5Acα3Galβ4GlcβO(CH$_2$)$_2$CH$_2$NH$_2$ |
| 78 | Galα3Galβ4GlcNAcαO(CH$_2$)$_2$CH$_2$NH$_2$ |
| 79 | Galβ3GalNAcαO(CH$_2$)$_2$CH$_2$NH$_2$ |
| 80 | Galβ4(Fucα3)GlcNAcβO(CH$_2$)$_2$CH$_2$NH$_2$ |
| 81 | Neu5Acα8NeuSAcα3Galβ4GlcO(CH$_2$)$_2$CH$_2$NH$_2$ |
| 82 | Neu5Acα8Neu5Acα3(GalNAcβ4)Galβ4GlcO(CH$_2$)$_2$CH$_2$NH$_2$ |
| 83 | Neu5Acα3Galβ3(Fucα4)GlcNAcβO(CH$_2$)$_2$CH$_2$NH$_2$ |
| 84 | Galβ3(Fucα4)GlcNAcβO(CH$_2$)$_2$CH$_2$NH$_2$ |
| 85 | Fucα2Galβ3(Fucα4)GlcNAcβO(CH$_2$)$_2$CH$_2$NH$_2$ |
| 86 | Neu5Gcα3Galβ3(Fucα4)GlcNAcβO(CH$_2$)$_2$CH$_2$NH$_2$ |
| 87 | Neu5,9Ac2α3Galβ3(Fucα4)GlcNAcβO(CH$_2$)$_2$CH$_2$NH$_2$ |
| 88 | Neu9Ac5Gcα3Galβ3(Fucα4)GlcNAcβO(CH$_2$)$_2$CH$_2$NH$_2$ |

Figure 7:
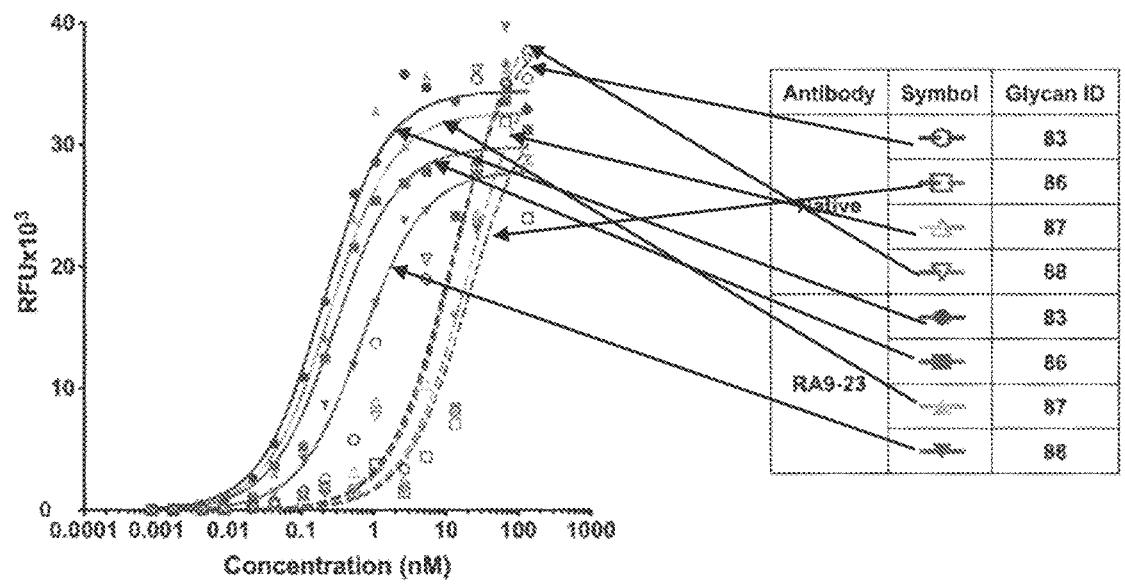

Further evaluation of affinities of these antibodies by saturation curves on the glycan microarrays showed that RA9-23 antibody had more than 55 fold higher affinity than the native antibody against AcSLeA (see FIG. 7 and Table 6). Even greater affinity improvement of >70 fold was measured against GcSLeA (from 19.8±8.8 to 0.28±0.05) and 9-O-AcSLeA (from 19.9±7.7 to 0.25±0.07).

TABLE 6

Affinity of RA9-23 antibodies to SLeA glycans

| Antibody | *Glycan ID | Glycan | $K_D$ | SD |
|---|---|---|---|---|
| Native (1116NS19.9) | 83 | Neu5Ac-SLeA | 11.3 | 5.5 |
| | 86 | Neu5Gc-SLeA | 19.8 | 8.8 |
| | 87 | 9-O-Neu5Ac-SLeA | 19.9 | 7.7 |
| | 88 | 9-O-Neu5Gc-SLeA | 13.64 | 5.9 |
| RA9-23 | 83 | NeuSAc-SLeA | 0.2 | 0.03 |
| | 86 | Neu5Gc-SLeA | 0.28 | 0.05 |
| | 87 | 9-O-NeuSAc-SLeA | 0.25 | 0.07 |
| | 88 | 9-O-Neu5Gc-SLeA | 0.67 | 0.29 |

All glycans present in Table 6 are tumor-associated carbohydrate antigens. SLeA can be either populated by Neu5Ac or by the non-human sialic acid Neu5Gc. GcSLeA and 9-O-GcSLeA are expected to appear more in cancer.

Example 4. RA9-23 Flexibility

Despite the fact that RA9-23 antibody differs from the native antibody mostly at the framework regions (with an exception of one amino acid, Y61N in substitution CDR2 of VH), it has an untypical much higher affinity against SLeA antigen. In order to gain mechanistic insights, we used molecular dynamic (MD) simulations of the VH and VL of both the native- and RA9-23 antibodies for 1 psec. The average, per-residue root mean square fluctuation (RMSF) for the Ca atoms was lower for RA9-23 versus native (0.75±0.05 Vs 0.82±0.03). This reduced flexibility of RA9-23 antibody versus the native antibody is statistically significant (p=0.0277, n=5, T-test). Some regions of the VH and VL chains were more flexible in RA9-23 antibody than in native antibody structure, but overall the flexibility was reduced in RA9-23 antibody as a result of the mutations/substitutions.

Example 5. Cancer Cell Lines Binding and Cytotoxicity

Figure 8A:
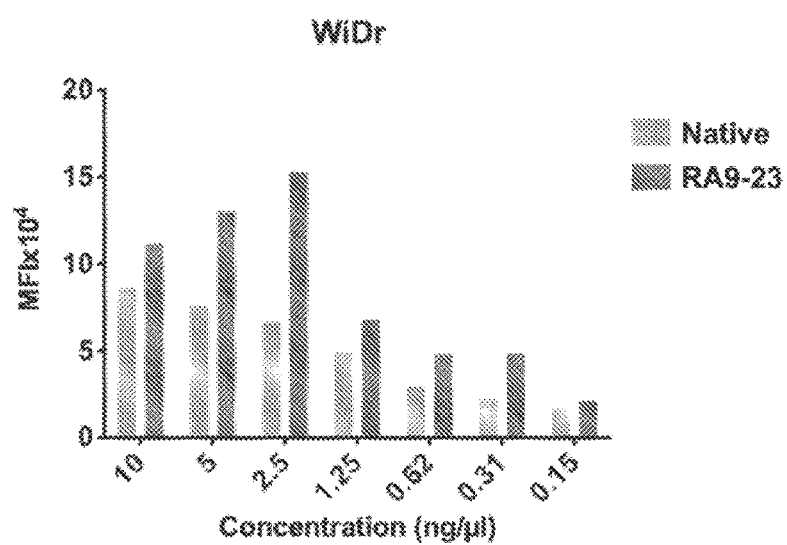
Figure 8B:
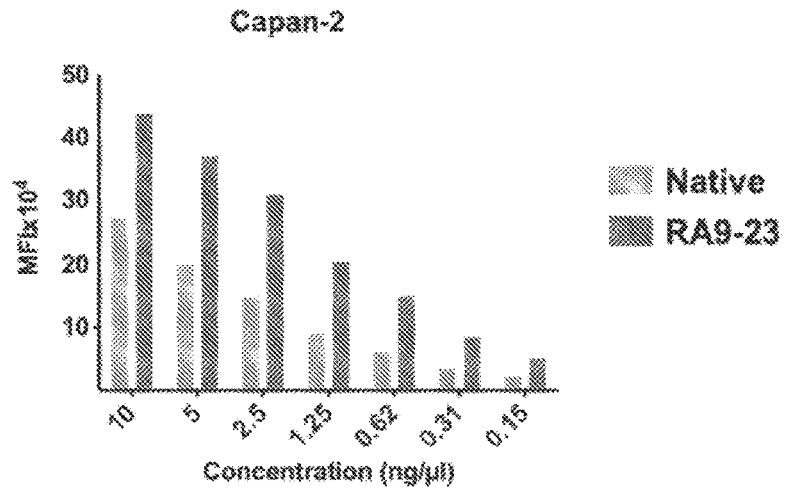
Figure 8C:
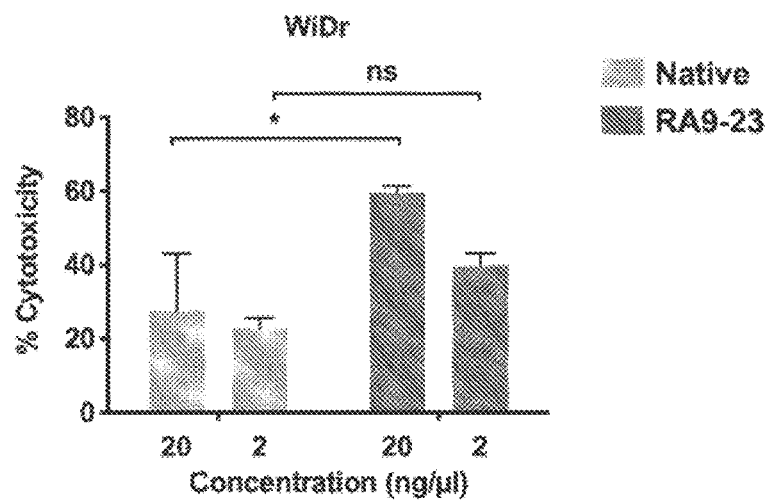
Figure 8D:
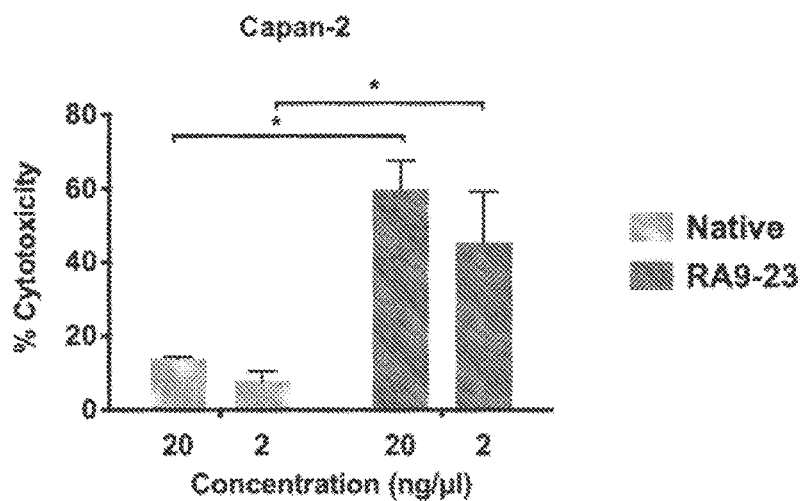
Figure 9A:
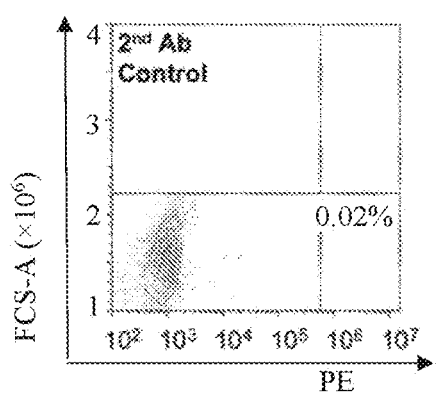
Figure 9B:
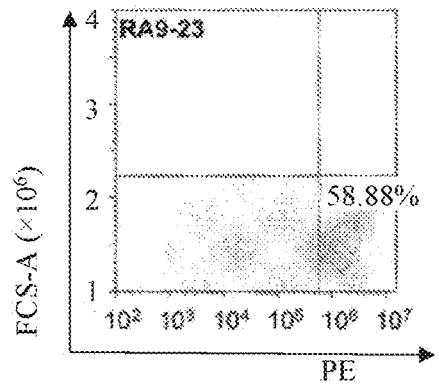
Figure 9C:
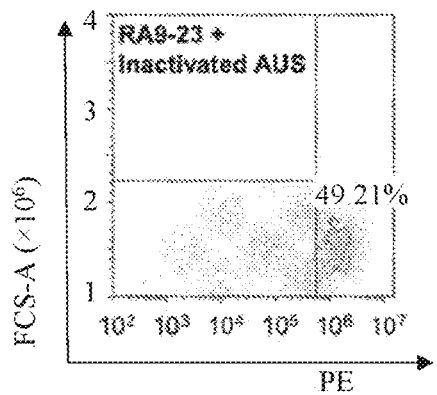
Figure 9D:
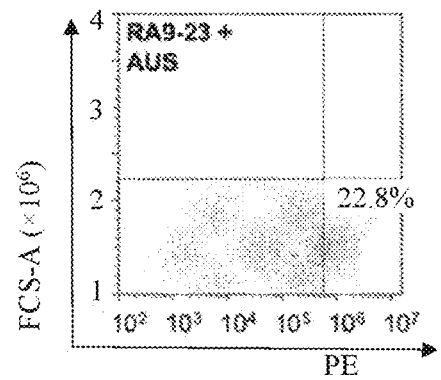

The mutated antibody RA9-23 showed improved binding of glycans by various methods, at different glycan densities (e.g. FACS, ELISA, glycan microarrays), and under flow (Biacore). Next, it was examined whether this is reflected in a better target recognition in the natural context of cancer cells. Cancer cell binding is critical for antibody therapeutic and diagnostic utilities. We compared the binding of native and RA9-23 antibodies to several SLeA-positive cancer cell lines (WiDr and Capan2: human colorectal and pancreatic cancer cell lines, respectively). RA9-23 antibodies showed better binding efficacy than the native antibody in both cell lines and at various concentrations (FIG. 8A and FIG. 8B). These results indicate that RA9-23 antibody has higher affinity not only in mono/polyvalent-glycans settings (FACS, ELISA, glycan microarrays), but also in the context of the whole cell. Typically cells do not uniformly express glycoconjugates (glycoproteins or glycolipids) but rather have them heterogeneously distributed over the cell surface. Better cell binding could potentially lead to improved killing of cancer cells. Antibodies of IgG1 isotype are known to be able to facilitate cell killing by complement recruitment (by CDC). The CDC killing potential of the antibodies was evaluated, revealing that the RA9-23 antibodies had a higher cytotoxicity in both WiDr and Capan2 cell lines compared to the native antibody (FIG. 8C and FIG. 8D). These results indicate the antibody from clone RA9-23 is more potent and could potentially be used for improved detection of SLeA and SLeA-positive tumors as well as in cancer therapeutics. As can be seen in FIG. 9, the binding of the antibody SLeA was reduced dramatically after removal of sialic acids from the cell surface by a sialidase treatment.

Example 7. Expression of $SLe^a$ in Different Types of Human

Immunohistochemistry of Human Cancers Tissue Microarray

The cloned RA9-23 human IgG1 antibody was biotinylated using the EZ-Link biotinylation Kit (Micro Sulfo-NHS-SS-Biotin; Pierce, Rockford, IL) according to the manufacturer's instructions, then human cancers tissue microarray (TMA) slides (BioSB CA, USA) consisting of twenty-three 2 mm cores formalin-fixed paraffin-embedded tissues were stained with this Bio-RA9-23-hIgG antibody. For this purpose, the slides were first deparaffinated by incubation in xylene (Merck) for 15 min twice, then rehydrated by sequential 2 min washes with decreased percentage of ethanol in double distilled $H_2O$ solution (100%, 95%, 90%, 80%, 70%, 50%, DDW), then washed twice in DDW. For antigen unmasking, slides were incubated for 15 min with 95° C. pre-heated HIER T-EDTA buffer pH 9 (Zymo), then transferred to DDW for additional 15 min, followed by rinsing in PBS pH 7.4 once. Slides were then blocked for one hour at room temperature (RT) by incubating with blocking solution (PBS pH 7.4, 0.1% Tween, 1% chicken ovalbumin [Sigma]). Biotin/avidin blocking was performed using a kit (Zotal), according to manufacturer's instructions. Slides were rinsed briefly with PBS, then fixed with 4% paraformaldehyde (PFA) for 10 min in RT, washed with PBST (PBS pH 7.4, 0.1% Tween) for 1 min, and incubated with 10 ng/µl Bio-RA9-23-hIgG overnight at 4° C. in a humidified chamber. The next day, slides were washed in PBST for 5 min, twice, then incubated with freshly prepared 0.3% $H_2O_2$ in PBS for 15 min. After one wash with PBS pH7.4, slides were incubated with 1 µg/ml HRP-streptavidin in PBS (Jackson) for 30 minutes at RT, followed by three washes with PBS 5 min each, then developed with substrate (3,3'-diaminobenzidine tetrahydrochloride: DAB) for 3 min, followed by washing once with DDW for 1 min and mounting with PermaMounter (Bio-SB). Slides were screened with Nikon eclipse Ti microscope at ×10 magnification.

Results

Human cancers tissue microarray (TMA) slides containing twenty three different cancer tissues were stained by immunohistochemistry using biotinylated RA9-23 antibody (Bio-RA9-23-hIgG) prepared as described above. The TMA included samples from melanoma, lung squamous cell carcinoma, lung adenocarcinoma, lung neuroendocrine cancer, papillary thyroid carcinoma, ductal breast carcinoma, Her-2 negative breast carcinoma, endometrial carcinoma, ovarian carcinoma, prostate adenocarcinoma, seminoma, hepatocellular carcinoma, renal clear cell carcinoma, diffuse type gastric adenocarcinoma, gastric GIST, pancreatic adenocarcinoma, colon adenocarcinoma, CLL/SLL lymphoma, follicular lymphoma, extranodal marginal zone lymphoma, mantle cell lymphoma, diffuse large B-cell lymphoma and lymphoblastic lymphoma. Of these tissues, lung and pancreatic adenocarcinomas showed strong staining, colon carcinoma and HER2-neg breast carcinoma showed moderate staining, and the other tissues seemed to be negative for SLeA. The results are presented in FIG. 10. As follows from these results, lung and pancreatic adenocarcinoma showed very high level of staining, and colon adenocarcinoma and Her-2 negative breast carcinoma showed high level of staining. This is a clear indication that these types of cancer express SLeA and may be targeted and treating using the CAR of the present invention that binds specifically to SLeA antigen.

Although the present invention has been described herein above by way of preferred embodiments thereof, it can be modified, without departing from the spirit and nature of the subject invention as defined in the appended claims.

The invention claimed is:

1. A monoclonal antibody (mAb) or a fragment thereof that specifically binds to Sialyl Lewis A glycan (SLeA), wherein the mAb or the fragment comprises an antigen binding domain comprising a heavy-chain variable domain (VH) and a light-chain variable domain (VL) each comprising three complementarity determining regions (CDRs), wherein the VH-CDR 1, 2 and 3 comprise amino acid sequences SEQ ID NOs: 15, 12, and 8, respectively, and the VL-CDRs 1, 2 and 3 comprise amino acid sequences SEQ ID NO: 9, 10, and 11, respectively.

2. The mAb or fragment according to claim 1, wherein VH-CDR1 comprises amino acid sequence selected from SEQ ID NO: 6 and 15, and the VH-CDR2 comprises amino acid sequence selected from SEQ ID NO: 12 and 21.

3. The mAb or fragment according to claim 1, wherein the CDRs 1, 2, and 3 of the VH domain comprises amino acid sequences SEQ ID NOs: 15, 21 and 8, respectively, the CDRs 1, 2, and 3 of the VL domain comprise amino acid sequences SEQ ID NOs: 9, 10 and 11, respectively, VH-framework domains (FRs) 1, 2 and 4 comprising amino acid sequences SEQ ID NOs: 24, 26 and 27, respectively, and a VL-FR1 comprising the amino acid sequence SEQ ID NO: 28.

4. The mAb or fragment according to claim 1, comprising:
i. a set of six CDR sequences comprising SEQ ID NOs: 15, 21, 8, 9, 10 and 11;
ii. a set of four VH framework sequences comprising SEQ ID NOs: 24, 26, 29 and 27; and
iii. a set of four VL framework sequences comprising SEQ ID NOs: 28, 30, 31 and 32.

5. The mAb or the fragment according claim 1, wherein the VH domain comprises amino acid sequence set forth in SEQ ID NO: 3 and the VL domain comprises amino acid sequence set forth in SEQ ID NO: 5.

6. The mAb or the fragment according to claim 1, wherein the fragment is a single chain variable fragment (scFv).

7. The mAb or the fragment according to claim 6, wherein the scFv comprises amino acid sequences SEQ ID NO: 3 and SEQ ID NO: 5.

8. The mAb or the fragment according to claim 7, wherein the scFv comprises amino acid sequence SEQ ID NO: 22 or an analog thereof having at least 90% sequence identity to said sequence.

9. The mAb or the fragment according to claim 1, characterized by at least one of:
(i) the mAb or the fragment binds SLeA glycan with an equilibrium dissociation constant ($K_D$) of from about 0.1 to about 30 nM;

(ii) the selectivity of said mAb or the fragment to SLeA glycan is at least 90%;
(iii) the mAb or the fragment is a chimeric antibody or fragment:
(iv) the mAb or the fragment has an IgG structure; and
(v) the light chain constant region is selected from kappa and lambda.

10. A conjugate comprising the mAb or the fragment according to claim 1.

11. A pharmaceutical composition comprising the mAb or the fragment according to claim 1 or a conjugate thereof, and a pharmaceutically acceptable carrier.

12. A kit for diagnosing a cancer in a subject, wherein the kit comprises the mAb or the fragment according to claim 1 or a conjugate thereof and means for detecting the amount of the mAb or the fragment bound to cells of the biological sample.

13. A monoclonal antibody (mAb) or a fragment thereof that specifically binds to Sialyl Lewis A glycan (SLeA), wherein the mAb or the fragment comprises an antigen binding domain comprising a heavy-chain variable domain (VH) and a light-chain variable domain (VL) each comprising three complementarity determining regions (CDRs) and four framework (FR) domains, wherein the VH-CDR 1, 2 and 3 comprise amino acid sequences SEQ ID NOs: 15, 12, and 8, respectively, the VL-CDRs 1, 2 and 3 comprise amino acid sequences SEQ ID NOs: 9, 10 and 11, respectively, the VH-FRs 1, 2 and 4 comprises acid sequences SEQ ID NOs: 23, 26 and 27, respectively, and the VL-FR 1 comprises acid sequence SEQ ID NO: 28.

14. The mAb or fragment according to claim 13, wherein the CDRs 1, 2, and 3 of the VH domain comprises amino acid sequences SEQ ID NOs: 15, 21 and 8, respectively, the CDRs 1, 2, and 3 of the VL domain comprise amino acid sequences SEQ ID NOs: 9, 10 and 11, respectively, the VH-(FRs) 1, 2 and 4 comprise amino acid sequences SEQ ID NOs: 24, 26 and 27, respectively, and the VL-FR1 comprising the amino acid sequence SEQ ID NO: 28.

15. The mAb or the fragment according to claim 13, wherein the fragment is a single chain variable fragment (scFv).

16. A conjugate comprising the mAb or the fragment according to claim 13.

17. A kit for diagnosing, cancer in a subject, wherein the kit comprises the mAb or fragment thereof according to claim 15 or a conjugate thereof and means for detecting the amount of the antibodies or antibody fragments bound to cells of the biological sample.

\* \* \* \* \*

```
                              SEQUENCE LISTING

<160> NUMBER OF SEQ ID NOS: 32

<210> SEQ ID NO 1
<211> LENGTH: 115
<212> TYPE: PRT
<213> ORGANISM: Mus musculus

<400> SEQUENCE: 1

Glu Val Lys Leu Glu Glu Ser Gly Gly Gly Leu Val Gln Pro Gly Gly
1               5                   10                  15

Ser Met Lys Leu Ser Cys Ala Ala Ser Gly Phe Thr Phe Ser Asp Ala
            20                  25                  30

Trp Met Asp Trp Val Arg Gln Ser Pro Glu Lys Gly Leu Glu Trp Val
        35                  40                  45

Ala Glu Ile Gly Asn Lys Gly Asn Asn His Ala Thr Tyr Tyr Ala Glu
    50                  55                  60

Ser Val Lys Gly Arg Phe Thr Val Ser Arg Asp Asp Ser Lys Ser Arg
65                  70                  75                  80

Val Tyr Leu Gln Met Asn Ser Leu Arg Val Glu Asp Thr Gly Thr Tyr
                85                  90                  95

Tyr Cys Thr Thr Arg Phe Ala Tyr Trp Gly Gln Gly Thr Leu Val Thr
            100                 105                 110

Val Ser Ala
        115

<210> SEQ ID NO 2
<211> LENGTH: 115
<212> TYPE: PRT
<213> ORGANISM: Artificial Sequence
<220> FEATURE:
<223> OTHER INFORMATION: synthesized

<400> SEQUENCE: 2

Glu Val Lys Leu Glu Glu Ser Gly Gly Gly Leu Val Gln Pro Gly Gly
1               5                   10                  15

Ser Met Lys Leu Ser Cys Ala Ala Ser Gly Phe Thr Phe Ser Asp Ala
            20                  25                  30

Trp Met Asp Trp Val Arg Gln Ser Pro Glu Lys Gly Leu Glu Trp Val
        35                  40                  45

Ala Glu Ile Gly Asn Lys Gly Asn Asn His Ala Thr Asn Tyr Ala Glu
    50                  55                  60

Ser Val Lys Gly Arg Phe Thr Val Ser Arg Asp Asp Ser Lys Ser Arg
65                  70                  75                  80

Val Tyr Leu Gln Met Asn Ser Leu Arg Val Glu Asp Thr Gly Thr Tyr
                85                  90                  95

Tyr Cys Thr Thr Arg Phe Ala Tyr Trp Gly Gln Gly Thr Leu Val Thr
            100                 105                 110

Val Ser Ala
        115

<210> SEQ ID NO 3
<211> LENGTH: 115
<212> TYPE: PRT
```

```
<213> ORGANISM: Artificial Sequence
<220> FEATURE:
<223> OTHER INFORMATION: synthesized

<400> SEQUENCE: 3

Lys Val Lys Leu Glu Glu Ser Gly Gly Gly Leu Val Gln Pro Gly Gly
1               5                   10                  15

Ser Met Lys Leu Ser Cys Ala Ala Ser Gly Phe Thr Phe Ser Asp Ala
            20                  25                  30

Trp Met Asp Trp Val Arg Gln Ser Pro Glu Lys Gly Leu Glu Trp Val
        35                  40                  45

Ala Glu Ile Gly Asn Lys Gly Asn Asn His Ala Thr Asn Tyr Ala Glu
    50                  55                  60

Ser Val Lys Gly Arg Phe Thr Val Ser Arg Asp Asp Ser Lys Ser Arg
65                  70                  75                  80

Val Tyr Leu Gln Met Asn Ser Leu Arg Val Glu Asp Thr Gly Thr Tyr
                85                  90                  95

Tyr Cys Thr Thr Arg Phe Ala Tyr Trp Gly Gln Gly Thr Pro Val Thr
            100                 105                 110

Val Pro Ala
        115

<210> SEQ ID NO 4
<211> LENGTH: 107
<212> TYPE: PRT
<213> ORGANISM: Mus musculus

<400> SEQUENCE: 4

Asp Ile Lys Met Thr Gln Ser Pro Ser Ser Met Tyr Ala Ser Leu Gly
1               5                   10                  15

Glu Arg Val Thr Ile Thr Cys Lys Ala Ser Gln Asp Ile Asn Ser Tyr
            20                  25                  30

Leu Ser Trp Phe Gln Gln Lys Pro Gly Lys Ser Pro Lys Thr Leu Ile
        35                  40                  45

Tyr Arg Ala Asn Arg Leu Val Asp Gly Val Pro Ser Arg Phe Ser Gly
    50                  55                  60

Ser Gly Ser Gly Gln Asp Tyr Ser Leu Thr Ile Ser Ser Leu Glu Tyr
65                  70                  75                  80

Glu Asp Met Gly Ile Tyr Tyr Cys Leu Gln Tyr Asp Glu Phe Pro Arg
                85                  90                  95

Thr Phe Gly Gly Gly Thr Lys Leu Glu Ile Lys
            100                 105

<210> SEQ ID NO 5
<211> LENGTH: 107
<212> TYPE: PRT
<213> ORGANISM: Artificial Sequence
<220> FEATURE:
<223> OTHER INFORMATION: synthesized

<400> SEQUENCE: 5

Asp Ile Lys Met Thr Gln Ser Pro Ser Ser Met Tyr Ala Ser Leu Gly
1               5                   10                  15

Glu Arg Val Thr Ile Pro Cys Lys Ala Ser Gln Asp Ile Asn Ser Tyr
            20                  25                  30

Leu Ser Trp Phe Gln Gln Lys Pro Gly Lys Ser Pro Lys Thr Leu Ile
        35                  40                  45

Tyr Arg Ala Asn Arg Leu Val Asp Gly Val Pro Ser Arg Phe Ser Gly
```

```
                50                  55                  60
Ser Gly Ser Gly Gln Asp Tyr Ser Leu Thr Ile Ser Ser Leu Glu Tyr
 65                  70                  75                  80

Glu Asp Met Gly Ile Tyr Tyr Cys Leu Gln Tyr Asp Glu Phe Pro Arg
                 85                  90                  95

Thr Phe Gly Gly Gly Thr Lys Leu Glu Ile Lys
            100                 105

<210> SEQ ID NO 6
<211> LENGTH: 10
<212> TYPE: PRT
<213> ORGANISM: Artificial Sequence
<220> FEATURE:
<223> OTHER INFORMATION: synthesized

<400> SEQUENCE: 6

Gly Phe Thr Phe Ser Asp Ala Trp Met Asp
 1               5                  10

<210> SEQ ID NO 7
<211> LENGTH: 16
<212> TYPE: PRT
<213> ORGANISM: Artificial Sequence
<220> FEATURE:
<223> OTHER INFORMATION: synthesized

<400> SEQUENCE: 7

Asn Lys Gly Asn Asn His Ala Thr Tyr Tyr Ala Glu Ser Val Lys Gly
 1               5                  10                  15

<210> SEQ ID NO 8
<211> LENGTH: 4
<212> TYPE: PRT
<213> ORGANISM: Artificial Sequence
<220> FEATURE:
<223> OTHER INFORMATION: synthesized

<400> SEQUENCE: 8

Arg Phe Ala Tyr
 1

<210> SEQ ID NO 9
<211> LENGTH: 11
<212> TYPE: PRT
<213> ORGANISM: Artificial Sequence
<220> FEATURE:
<223> OTHER INFORMATION: synthesized

<400> SEQUENCE: 9

Lys Ala Ser Gln Asp Ile Asn Ser Tyr Leu Ser
 1               5                  10

<210> SEQ ID NO 10
<211> LENGTH: 7
<212> TYPE: PRT
<213> ORGANISM: Artificial Sequence
<220> FEATURE:
<223> OTHER INFORMATION: synthesized

<400> SEQUENCE: 10

Arg Ala Asn Arg Leu Val Asp
 1               5

<210> SEQ ID NO 11
<211> LENGTH: 10
```

```
<212> TYPE: PRT
<213> ORGANISM: Artificial Sequence
<220> FEATURE:
<223> OTHER INFORMATION: synthesized

<400> SEQUENCE: 11

Leu Gln Tyr Asp Glu Phe Pro Arg Thr Phe
1               5                   10

<210> SEQ ID NO 12
<211> LENGTH: 16
<212> TYPE: PRT
<213> ORGANISM: Artificial Sequence
<220> FEATURE:
<223> OTHER INFORMATION: synthesized

<400> SEQUENCE: 12

Asn Lys Gly Asn Asn His Ala Thr Asn Tyr Ala Glu Ser Val Lys Gly
1               5                   10                  15

<210> SEQ ID NO 13
<211> LENGTH: 345
<212> TYPE: DNA
<213> ORGANISM: Artificial Sequence
<220> FEATURE:
<223> OTHER INFORMATION: synthesized

<400> SEQUENCE: 13
aaagtcaagc tagaagaaag cggtggcgga cttgttcagc ctgggggatc catgaagtta      60
tcttgcgccg catccggttt tacctttcct gatgcctgga tggattgggt gagacaatct    120
ccagaaaaag gtctggaatg ggtagccgaa attggtaaca agggcaataa tcacgccacg    180
aactatgccg agtctgtaaa aggaagattc actgtttcca gagacgattc aaagtccaga    240
gtctatctac aaatgaattc attaagagtc gaagatactg gtacttacta ctgtaccact    300
aggtttgcat attggggtca aggtacaccg gtgacggttc ctgcc                    345

<210> SEQ ID NO 14
<211> LENGTH: 321
<212> TYPE: DNA
<213> ORGANISM: Artificial Sequence
<220> FEATURE:
<223> OTHER INFORMATION: synthesized

<400> SEQUENCE: 14
gacattaaaa tgactcagag tccatcctca atgtacgctt ccttaggaga aagagtcact      60
atcccttgca aggcatccca agatatcaac tcatacttga gttggttcca acaaaaacca    120
ggtaaatctc ctaaaaccct gatttatcgt gccaataggc ttgtggatgg cgttccatcc    180
agattcagcg gatcaggtag tgggcaagat tattctttga caatttcctc attggaatac    240
gaagatatgg gcatatacta ttgcttacag tatgatgagt ttccacgtac ttttggcggt    300
ggaacaaaat tagaaatcaa a                                              321

<210> SEQ ID NO 15
<211> LENGTH: 5
<212> TYPE: PRT
<213> ORGANISM: Artificial Sequence
<220> FEATURE:
<223> OTHER INFORMATION: synthesized

<400> SEQUENCE: 15

Asp Ala Trp Met Asp
1               5
```

```
<210> SEQ ID NO 16
<211> LENGTH: 19
<212> TYPE: PRT
<213> ORGANISM: Artificial Sequence
<220> FEATURE:
<223> OTHER INFORMATION: synthesized

<400> SEQUENCE: 16

Glu Ile Gly Asn Lys Gly Asn Asn His Ala Thr Tyr Tyr Ala Glu Ser
1               5                   10                  15

Val Lys Gly

<210> SEQ ID NO 17
<211> LENGTH: 5
<212> TYPE: PRT
<213> ORGANISM: Artificial Sequence
<220> FEATURE:
<223> OTHER INFORMATION: synthesized

<400> SEQUENCE: 17

Gly Gly Gly Gly Ser
1               5

<210> SEQ ID NO 18
<211> LENGTH: 10
<212> TYPE: PRT
<213> ORGANISM: Artificial Sequence
<220> FEATURE:
<223> OTHER INFORMATION: synthesized

<400> SEQUENCE: 18

Gly Gly Gly Gly Ser Gly Gly Gly Gly Ser
1               5                   10

<210> SEQ ID NO 19
<211> LENGTH: 15
<212> TYPE: PRT
<213> ORGANISM: Artificial Sequence
<220> FEATURE:
<223> OTHER INFORMATION: synthesized

<400> SEQUENCE: 19

Gly Gly Gly Gly Ser Gly Gly Gly Gly Ser Gly Gly Gly Gly Ser
1               5                   10                  15

<210> SEQ ID NO 20
<211> LENGTH: 45
<212> TYPE: DNA
<213> ORGANISM: Artificial Sequence
<220> FEATURE:
<223> OTHER INFORMATION: Synthesized

<400> SEQUENCE: 20
ggaggtggcg gtagcggagg cggcggttct ggaggtggcg ggagc            45

<210> SEQ ID NO 21
<211> LENGTH: 19
<212> TYPE: PRT
<213> ORGANISM: Artificial Sequence
<220> FEATURE:
<223> OTHER INFORMATION: synthesized

<400> SEQUENCE: 21

Glu Ile Gly Asn Lys Gly Asn Asn His Ala Thr Asn Tyr Ala Glu Ser
1               5                   10                  15
```

-continued

```
Val Lys Gly

<210> SEQ ID NO 22
<211> LENGTH: 237
<212> TYPE: PRT
<213> ORGANISM: Artificial Sequence
<220> FEATURE:
<223> OTHER INFORMATION: synthesized

<400> SEQUENCE: 22

Lys Val Lys Leu Glu Glu Ser Gly Gly Gly Leu Val Gln Pro Gly Gly
1               5                   10                  15

Ser Met Lys Leu Ser Cys Ala Ala Ser Gly Phe Thr Phe Ser Asp Ala
            20                  25                  30

Trp Met Asp Trp Val Arg Gln Ser Pro Glu Lys Gly Leu Glu Trp Val
        35                  40                  45

Ala Glu Ile Gly Asn Lys Gly Asn Asn His Ala Thr Asn Tyr Ala Glu
    50                  55                  60

Ser Val Lys Gly Arg Phe Thr Val Ser Arg Asp Asp Ser Lys Ser Arg
65                  70                  75                  80

Val Tyr Leu Gln Met Asn Ser Leu Arg Val Glu Asp Thr Gly Thr Tyr
                85                  90                  95

Tyr Cys Thr Thr Arg Phe Ala Tyr Trp Gly Gln Gly Thr Pro Val Thr
            100                 105                 110

Val Pro Ala Gly Gly Gly Gly Ser Gly Gly Gly Ser Gly Gly Gly
        115                 120                 125

Gly Ser Asp Ile Lys Met Thr Gln Ser Pro Ser Ser Met Tyr Ala Ser
    130                 135                 140

Leu Gly Glu Arg Val Thr Ile Pro Cys Lys Ala Ser Gln Asp Ile Asn
145                 150                 155                 160

Ser Tyr Leu Ser Trp Phe Gln Gln Lys Pro Gly Lys Ser Pro Lys Thr
                165                 170                 175

Leu Ile Tyr Arg Ala Asn Arg Leu Val Asp Gly Val Pro Ser Arg Phe
            180                 185                 190

Ser Gly Ser Gly Ser Gly Gln Asp Tyr Ser Leu Thr Ile Ser Ser Leu
        195                 200                 205

Glu Tyr Glu Asp Met Gly Ile Tyr Tyr Cys Leu Gln Tyr Asp Glu Phe
    210                 215                 220

Pro Arg Thr Phe Gly Gly Gly Thr Lys Leu Glu Ile Lys
225                 230                 235

<210> SEQ ID NO 23
<211> LENGTH: 25
<212> TYPE: PRT
<213> ORGANISM: Artificial Sequence
<220> FEATURE:
<223> OTHER INFORMATION: synthesized

<400> SEQUENCE: 23

Lys Val Lys Leu Glu Glu Ser Gly Gly Gly Leu Val Gln Pro Gly Gly
1               5                   10                  15

Ser Met Lys Leu Ser Cys Ala Ala Ser
            20                  25

<210> SEQ ID NO 24
<211> LENGTH: 30
<212> TYPE: PRT
<213> ORGANISM: Artificial Sequence
```

```
<220> FEATURE:
<223> OTHER INFORMATION: synthesized

<400> SEQUENCE: 24

Lys Val Lys Leu Glu Glu Ser Gly Gly Gly Leu Val Gln Pro Gly Gly
1               5                   10                  15

Ser Met Lys Leu Ser Cys Ala Ala Ser Gly Phe Thr Phe Ser
            20                  25                  30

<210> SEQ ID NO 25
<211> LENGTH: 17
<212> TYPE: PRT
<213> ORGANISM: Artificial Sequence
<220> FEATURE:
<223> OTHER INFORMATION: synthesized

<400> SEQUENCE: 25

Trp Val Arg Gln Ser Pro Glu Lys Gly Leu Glu Trp Val Ala Glu Ile
1               5                   10                  15

Gly

<210> SEQ ID NO 26
<211> LENGTH: 14
<212> TYPE: PRT
<213> ORGANISM: Artificial Sequence
<220> FEATURE:
<223> OTHER INFORMATION: synthesized

<400> SEQUENCE: 26

Trp Val Arg Gln Ser Pro Glu Lys Gly Leu Glu Trp Val Ala
1               5                   10

<210> SEQ ID NO 27
<211> LENGTH: 11
<212> TYPE: PRT
<213> ORGANISM: Artificial Sequence
<220> FEATURE:
<223> OTHER INFORMATION: synthesized

<400> SEQUENCE: 27

Trp Gly Gln Gly Thr Pro Val Thr Val Pro Ala
1               5                   10

<210> SEQ ID NO 28
<211> LENGTH: 23
<212> TYPE: PRT
<213> ORGANISM: Artificial Sequence
<220> FEATURE:
<223> OTHER INFORMATION: Synthesized

<400> SEQUENCE: 28

Asp Ile Lys Met Thr Gln Ser Pro Ser Ser Met Tyr Ala Ser Leu Gly
1               5                   10                  15

Glu Arg Val Thr Ile Pro Cys
            20

<210> SEQ ID NO 29
<211> LENGTH: 32
<212> TYPE: PRT
<213> ORGANISM: Artificial Sequence
<220> FEATURE:
<223> OTHER INFORMATION: Synthesized

<400> SEQUENCE: 29

Arg Phe Thr Val Ser Arg Asp Asp Ser Lys Ser Arg Val Tyr Leu Gln
```

```
1               5                   10                  15
Met Asn Ser Leu Arg Val Glu Asp Thr Gly Thr Tyr Tyr Cys Thr Thr
                20                  25              30
```

<210> SEQ ID NO 30
<211> LENGTH: 15
<212> TYPE: PRT
<213> ORGANISM: Artificial Sequence
<220> FEATURE:
<223> OTHER INFORMATION: Synthesized

<400> SEQUENCE: 30

```
Trp Phe Gln Gln Lys Pro Gly Lys Ser Pro Lys Thr Leu Ile Tyr
1               5                   10                  15
```

<210> SEQ ID NO 31
<211> LENGTH: 32
<212> TYPE: PRT
<213> ORGANISM: Artificial Sequence
<220> FEATURE:
<223> OTHER INFORMATION: Synthesized

<400> SEQUENCE: 31

```
Gly Val Pro Ser Arg Phe Ser Gly Ser Gly Ser Gly Gln Asp Tyr Ser
1               5                   10                  15

Leu Thr Ile Ser Ser Leu Glu Tyr Glu Asp Met Gly Ile Tyr Tyr Cys
                20                  25              30
```

<210> SEQ ID NO 32
<211> LENGTH: 9
<212> TYPE: PRT
<213> ORGANISM: Artificial Sequence
<220> FEATURE:
<223> OTHER INFORMATION: Synthesized

<400> SEQUENCE: 32

```
Gly Gly Gly Thr Lys Leu Glu Ile Lys
1               5
```